United States Patent
Hauth

(10) Patent No.: US 9,637,905 B2
(45) Date of Patent: May 2, 2017

(54) HAND-HELD SHOWER HOLDING DEVICE

(71) Applicant: Neoperl GmbH, Mullheim (DE)

(72) Inventor: Matthias Hauth, Oberried/St. Wilhelm (DE)

(73) Assignee: Neoperl GmbH, Müllheim (DE)

( * ) Notice: Subject to any disclaimer, the term of this patent is extended or adjusted under 35 U.S.C. 154(b) by 138 days.

(21) Appl. No.: 14/760,073

(22) PCT Filed: Mar. 10, 2014

(86) PCT No.: PCT/EP2014/000610
§ 371 (c)(1),
(2) Date: Jul. 9, 2015

(87) PCT Pub. No.: WO2014/139661
PCT Pub. Date: Sep. 18, 2014

(65) Prior Publication Data
US 2015/0354192 A1 Dec. 10, 2015

(30) Foreign Application Priority Data
Mar. 11, 2013 (DE) .................... 20 2013 002 280 U

(51) Int. Cl.
| A61H 35/00 | (2006.01) |
| E03D 9/08 | (2006.01) |
| E03C 1/04 | (2006.01) |
| E03C 1/06 | (2006.01) |
| F16K 31/08 | (2006.01) |
| F16K 31/385 | (2006.01) |
| F16K 31/524 | (2006.01) |

(52) U.S. Cl.
CPC ............ *E03D 9/085* (2013.01); *E03C 1/0408* (2013.01); *E03C 1/06* (2013.01); *F16K 31/086* (2013.01); *F16K 31/385* (2013.01); *F16K 31/3855* (2013.01); *F16K 31/52491* (2013.01)

(58) Field of Classification Search
CPC ..... E03D 9/085; E03C 1/0408; E03C 1/0409; E03C 1/06
USPC ........................................... 4/443, 448, 615
See application file for complete search history.

(56) References Cited

U.S. PATENT DOCUMENTS

| 2,364,491 A | 12/1944 | C.A.M. Triadou |
| 2015/0240956 A1* | 8/2015 | Ramos De Barros .. E03D 9/085 4/443 |

FOREIGN PATENT DOCUMENTS

| EP | 1548344 | 6/2005 |
| FR | 1216187 | 4/1960 |

* cited by examiner

Primary Examiner — Huyen Le
(74) Attorney, Agent, or Firm — Volpe and Koenig, P.C.

(57) ABSTRACT

A hand-held shower holding device, including a hand-held shower holder (21), in which a hand-held shower (5) can be deposited. The hand-held shower holding device according to the invention is characterized in that the hand-held shower holding device has a switching element (1) having an actuating arm (18) intended for actuating the switching element (1), which actuating arm bears the hand-held shower holder (21) at a first end (19) of the arm and can be pivoted under the load of a hand-held shower (5) deposited in the hand-held shower holder (21) from a first actuation position into a second actuation position.

21 Claims, 20 Drawing Sheets

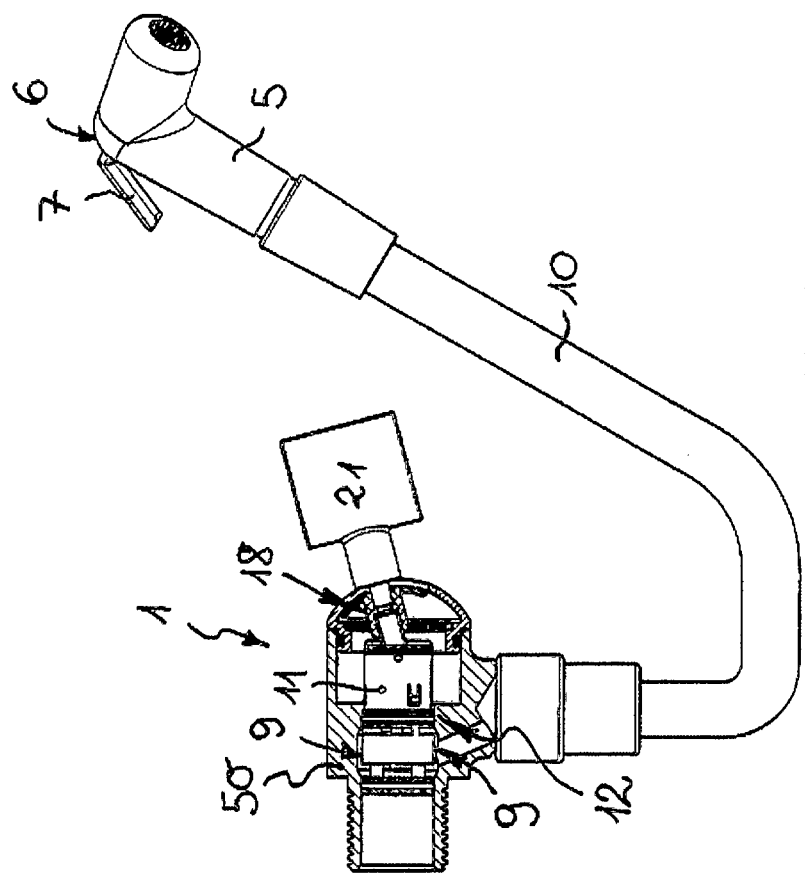
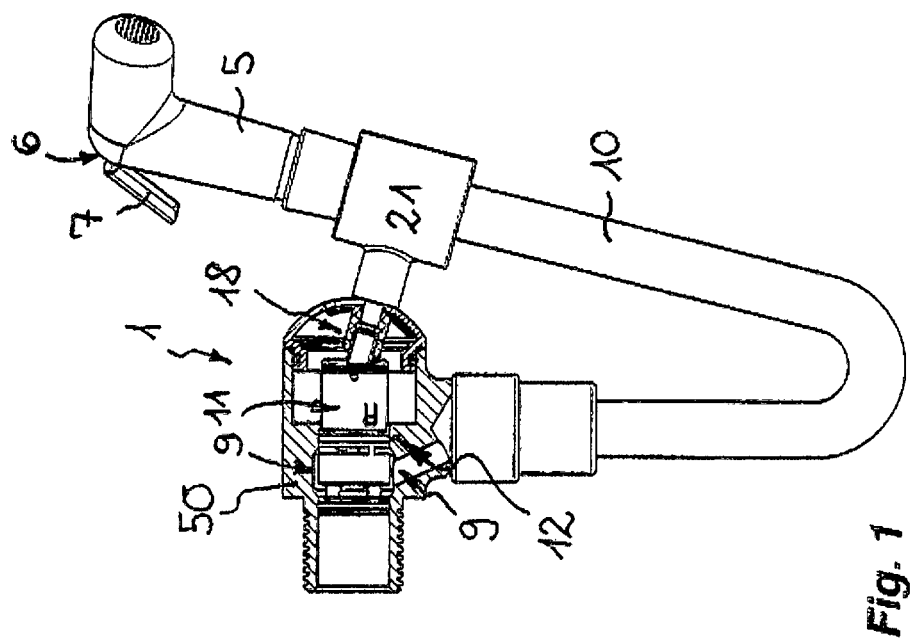
Fig. 2
Fig. 1

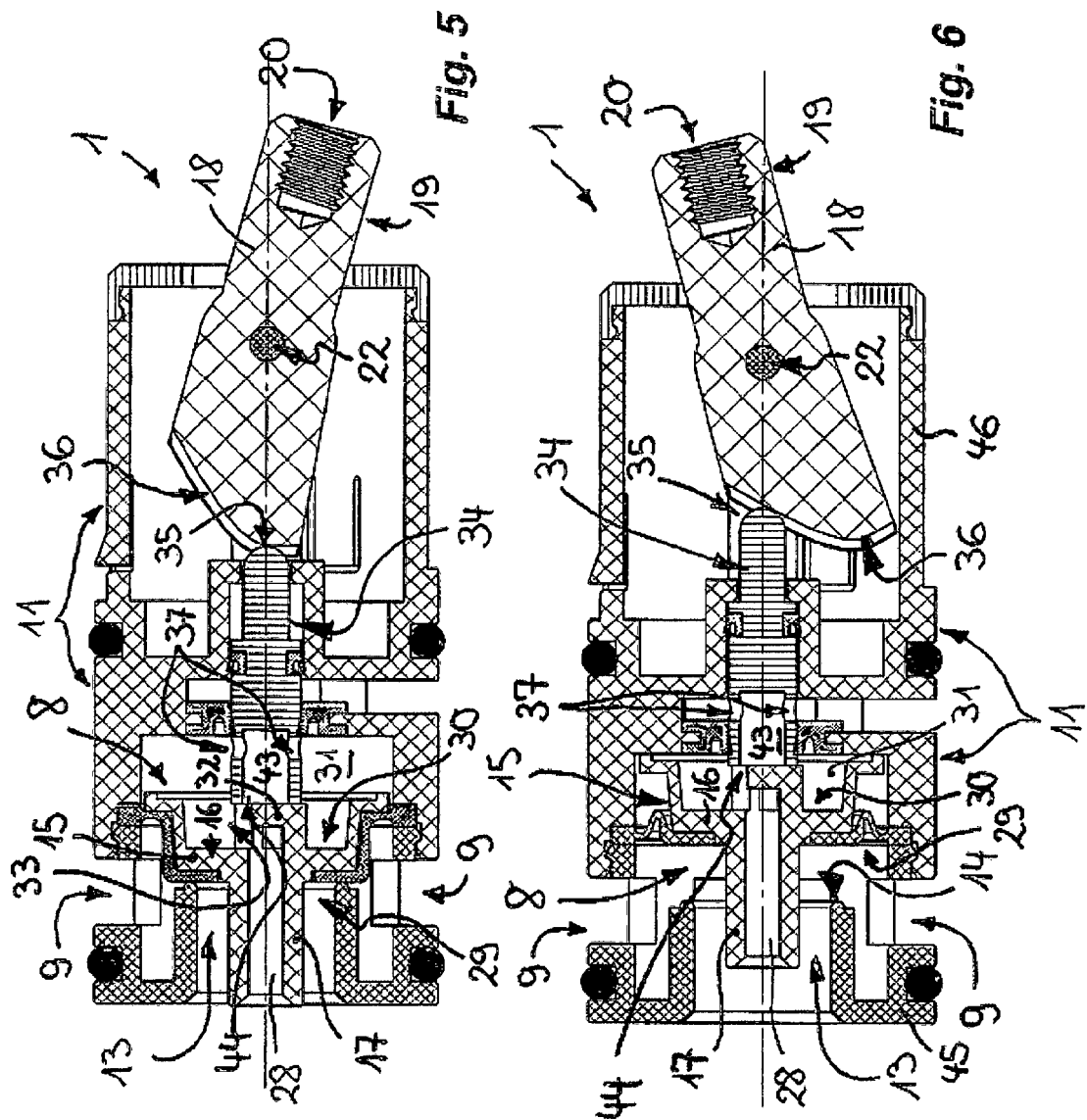

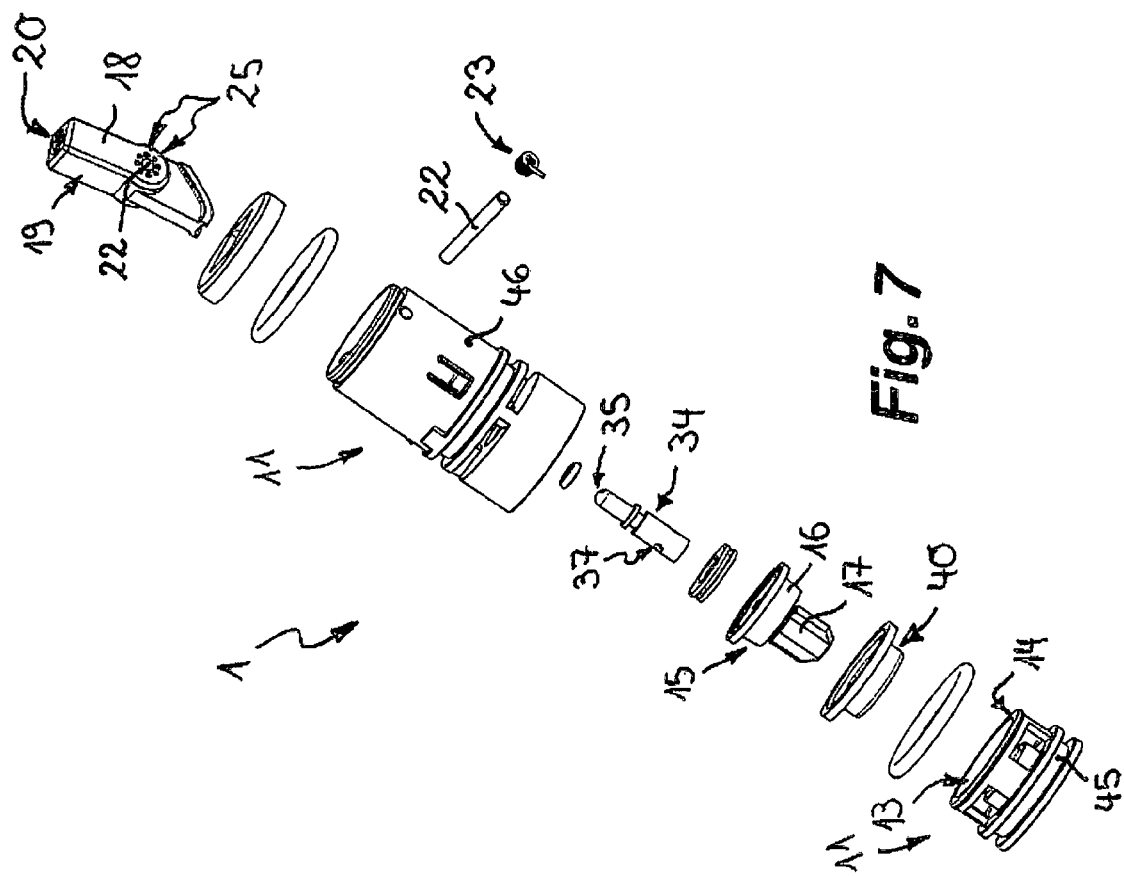

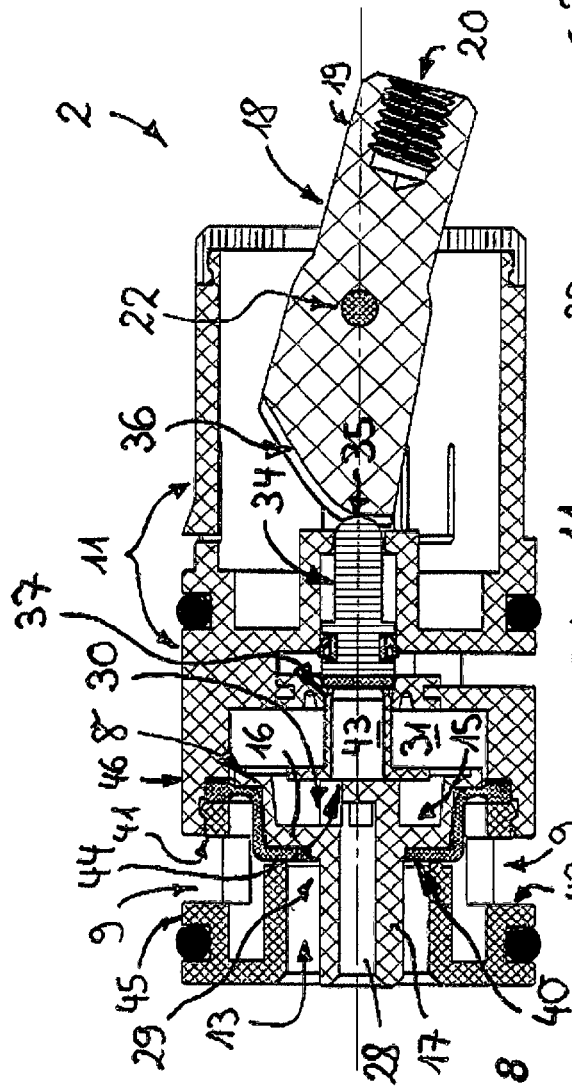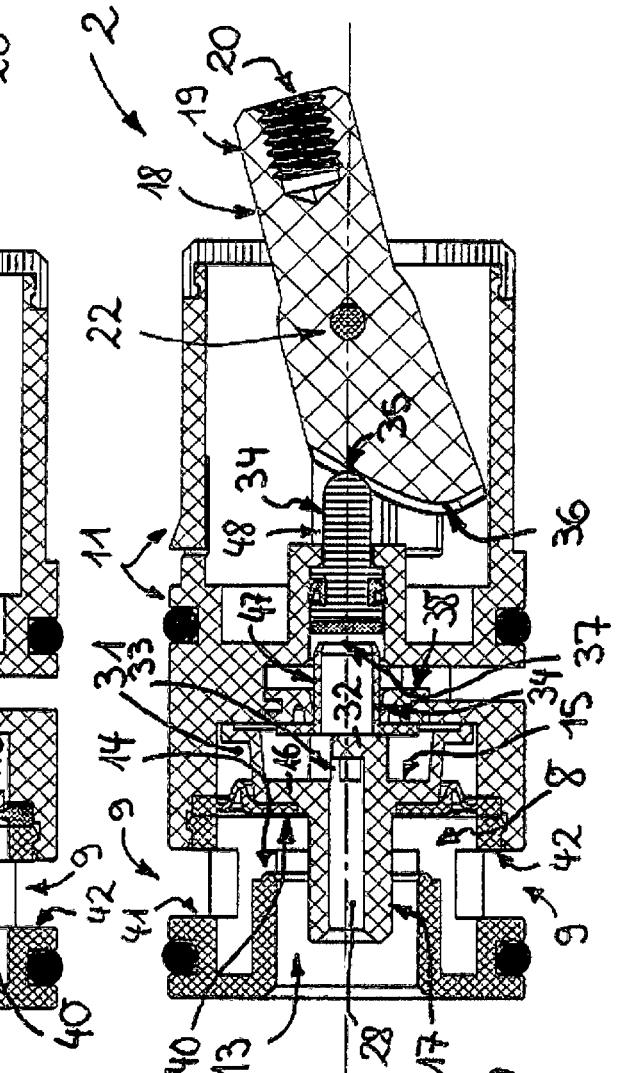
Fig. 8
Fig. 9

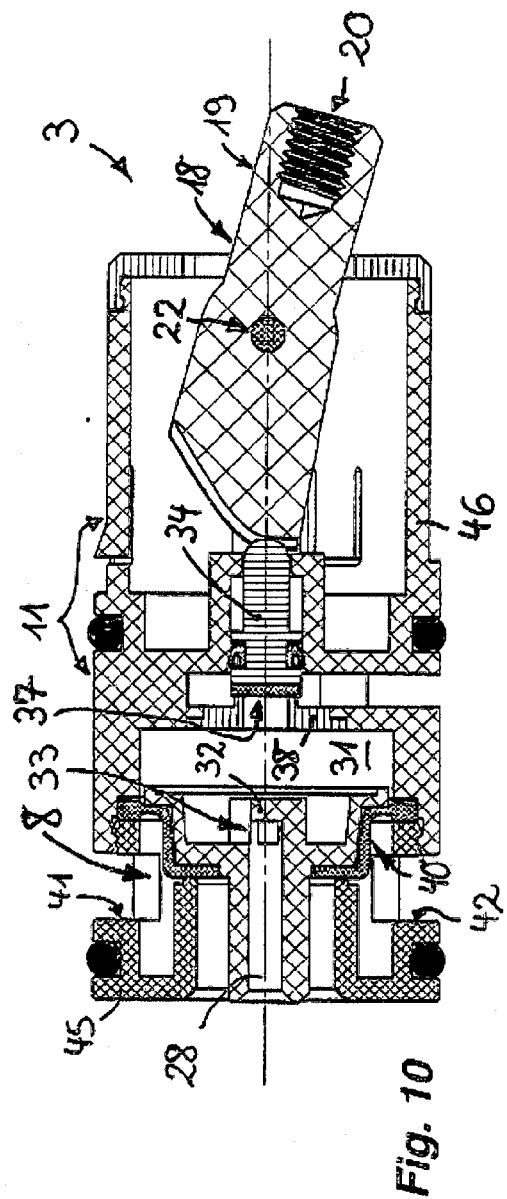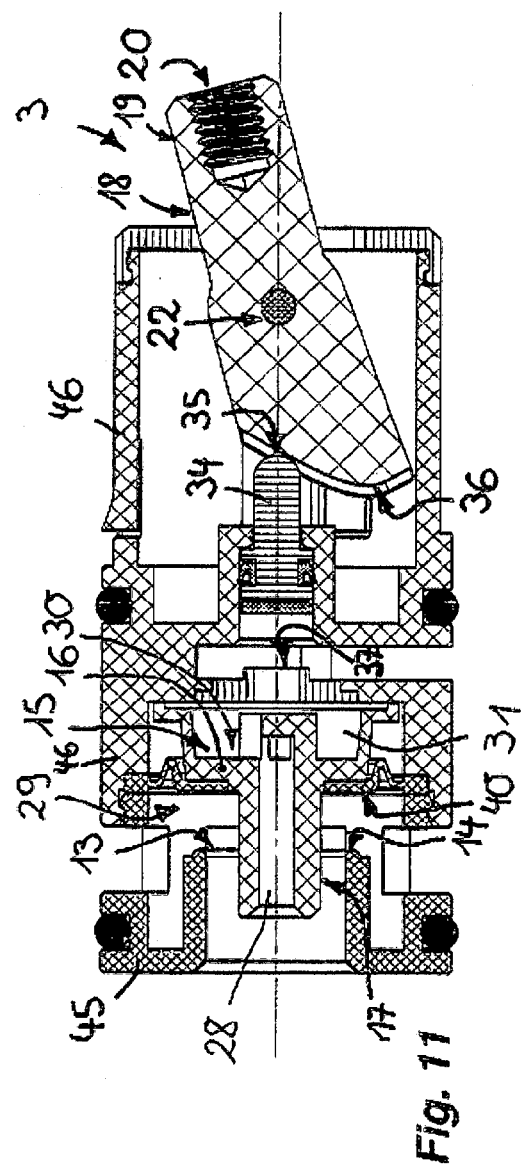

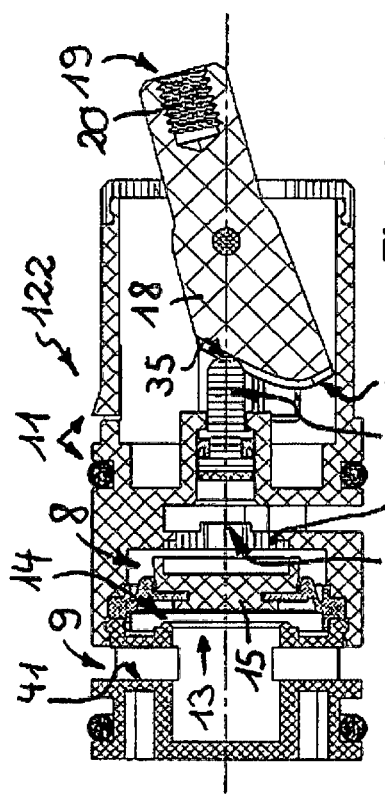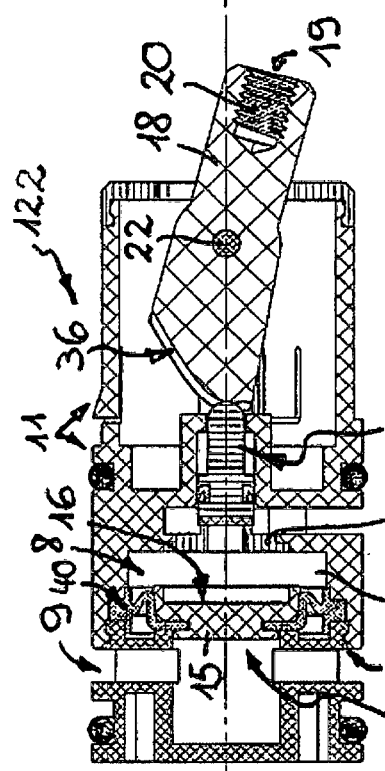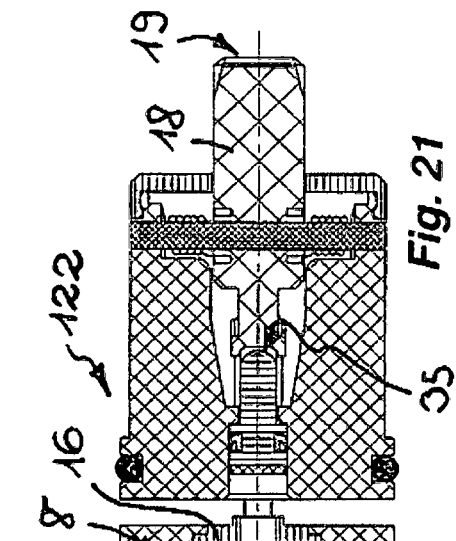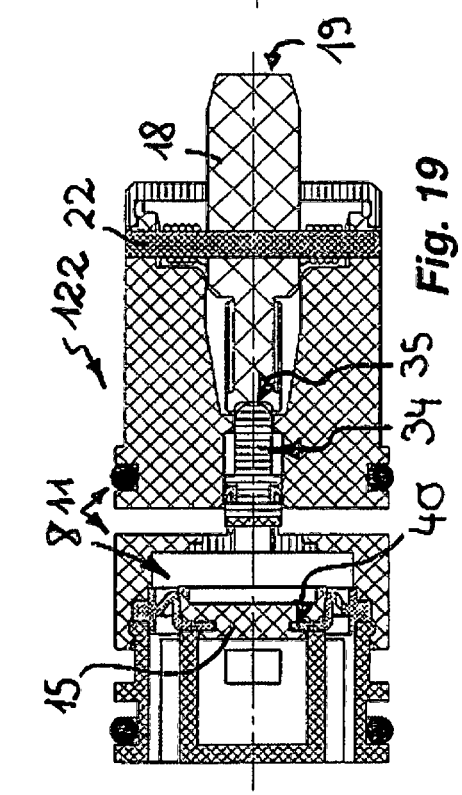

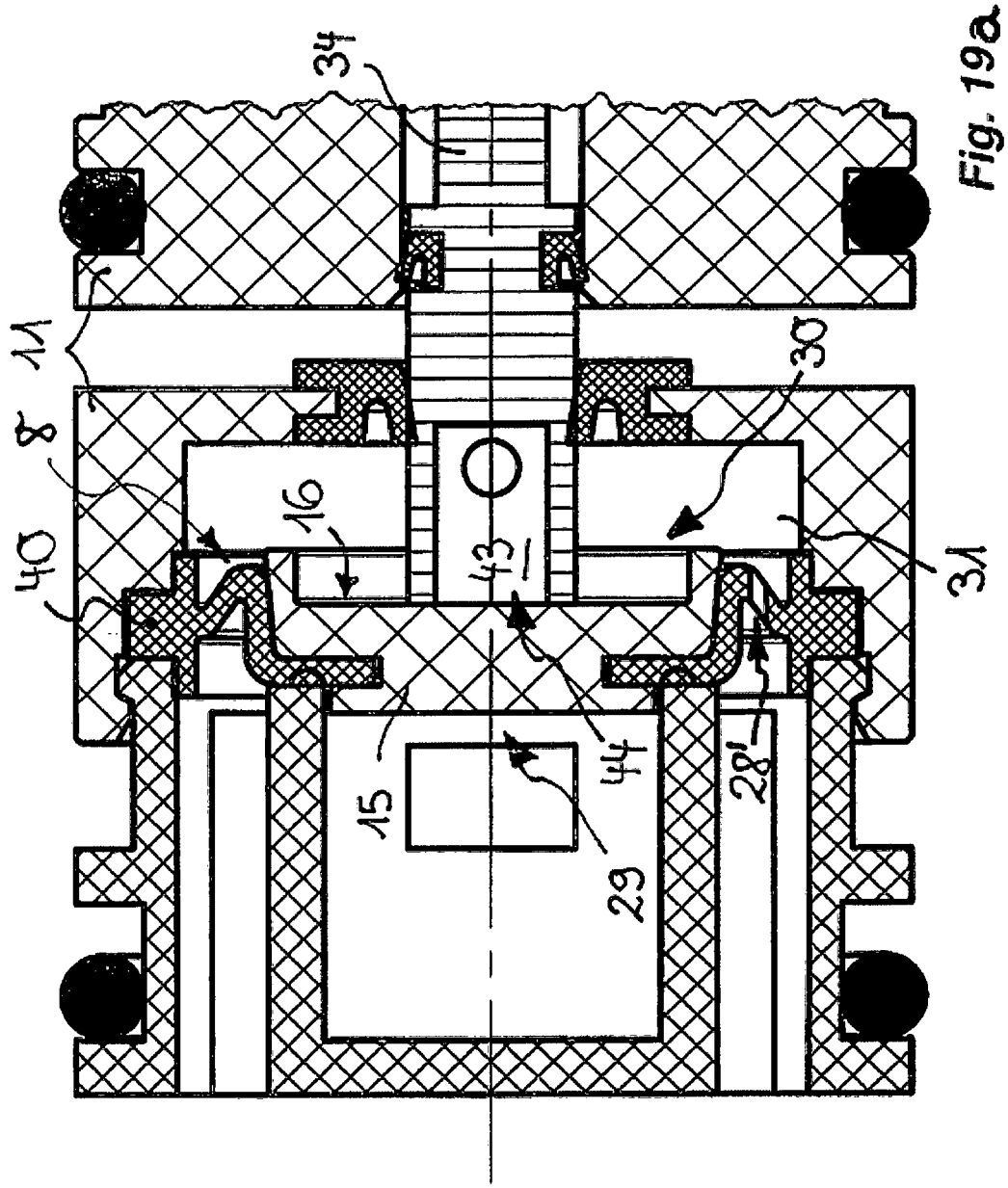

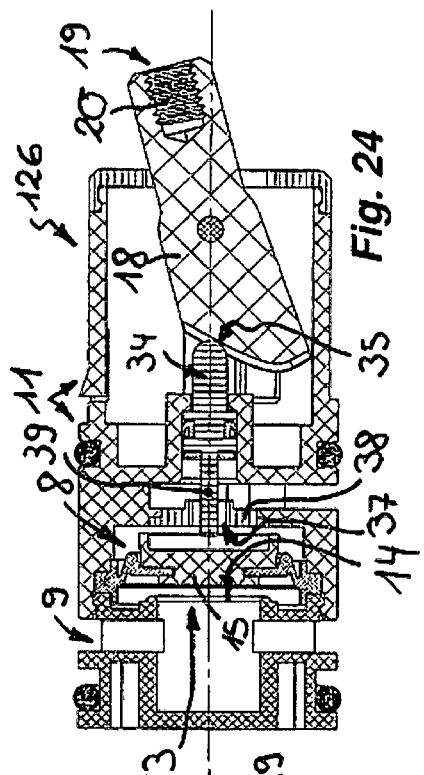
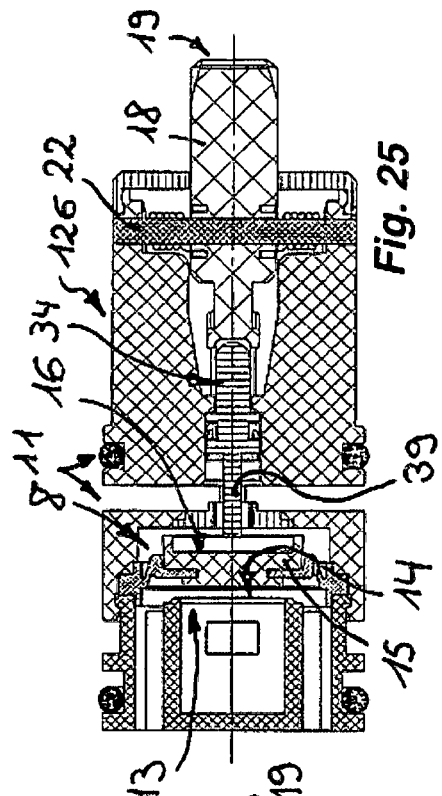
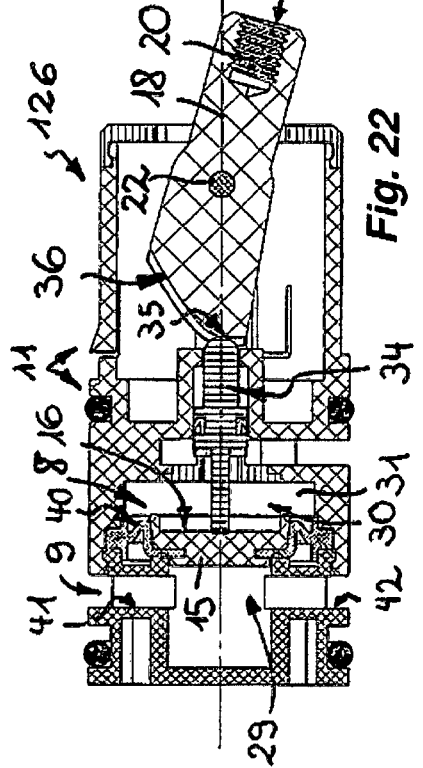
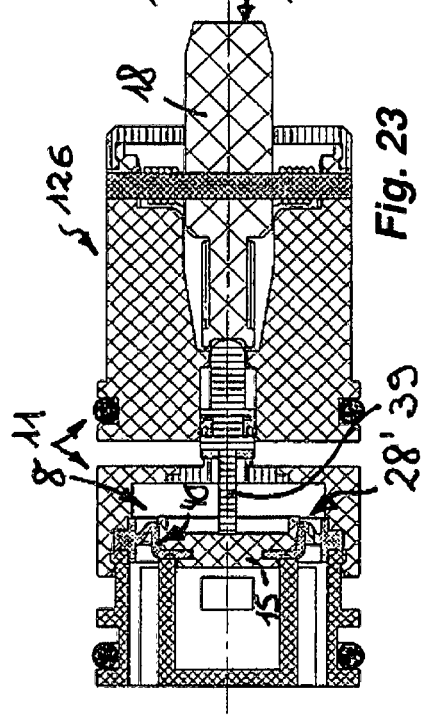

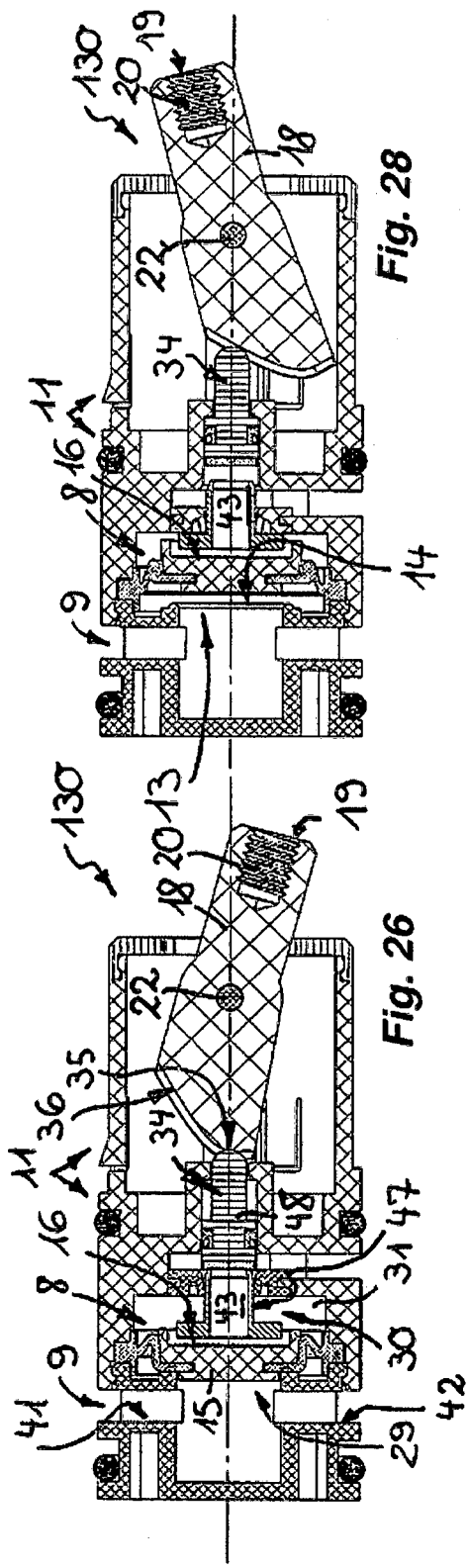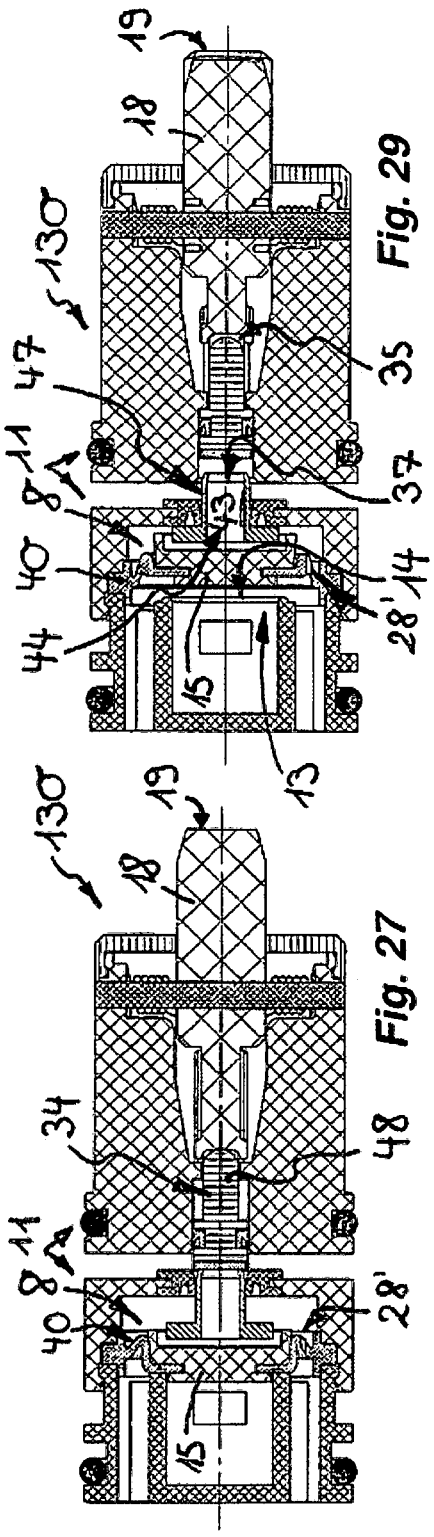

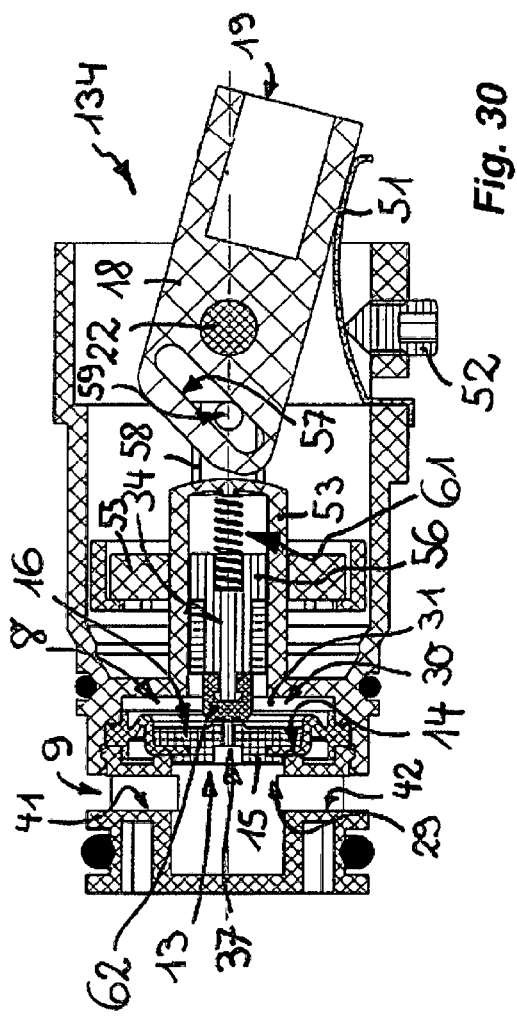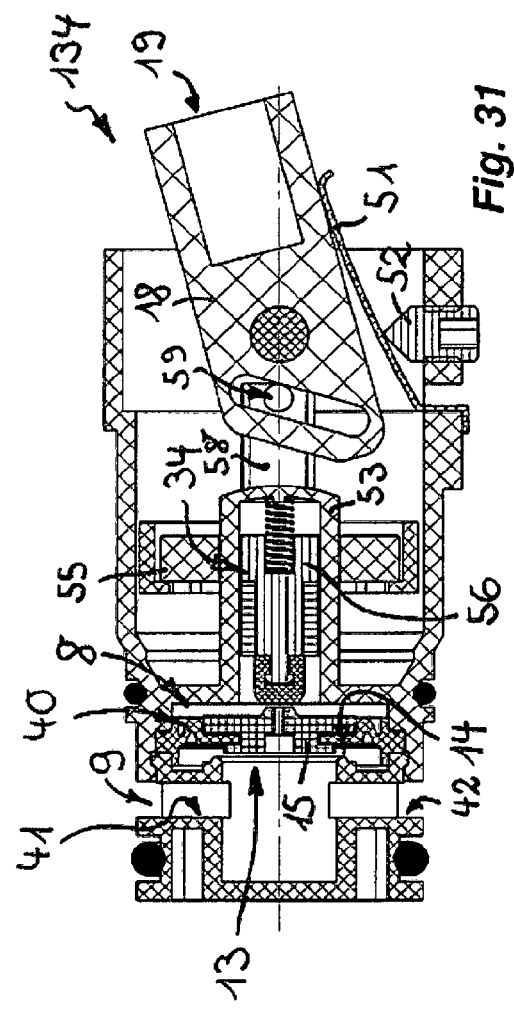

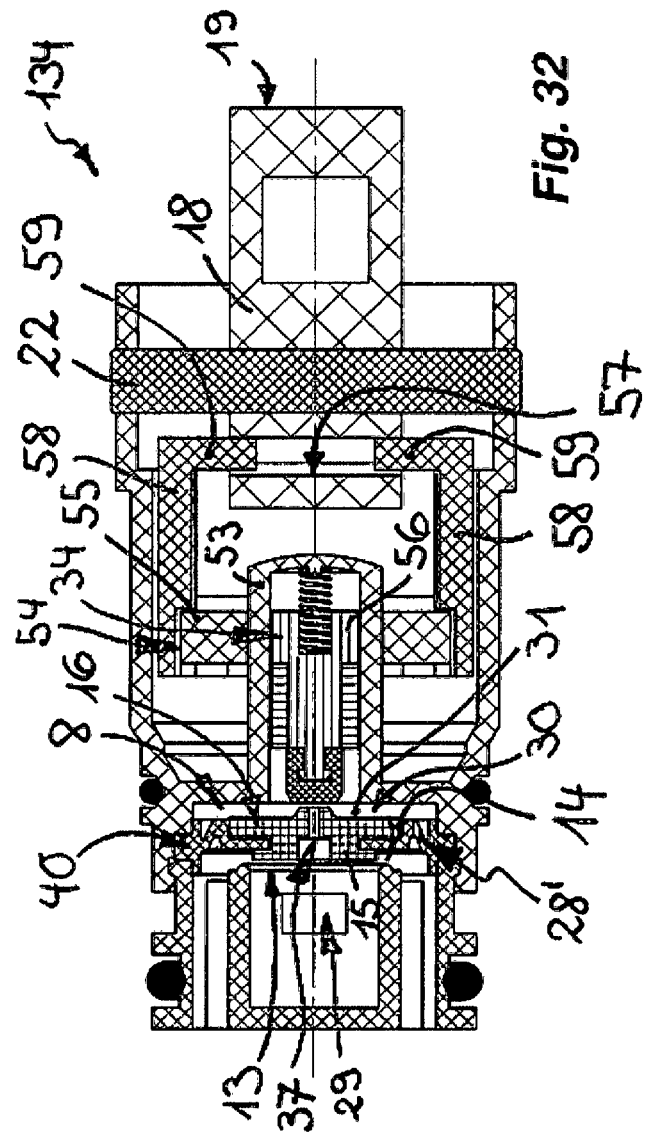

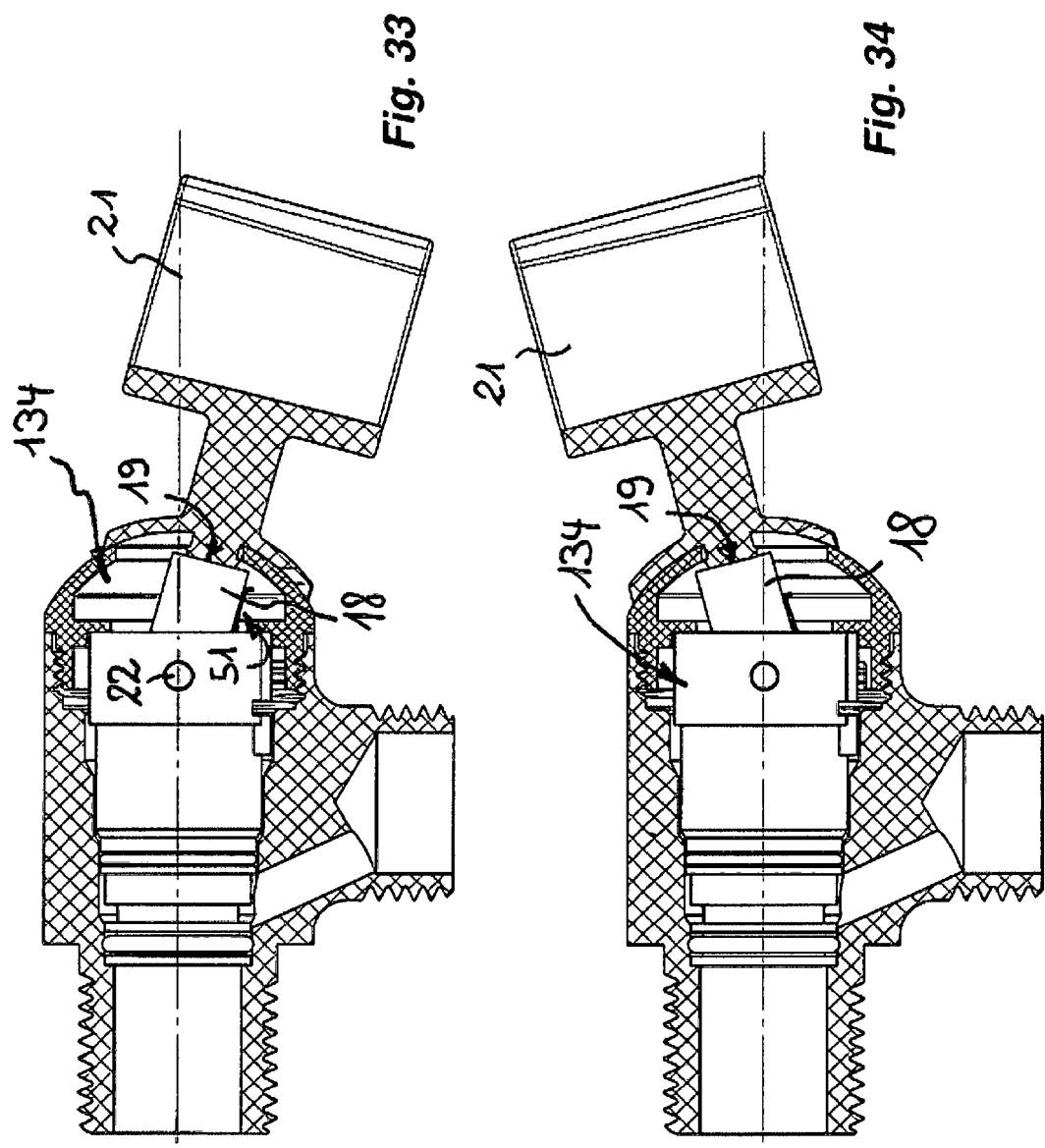

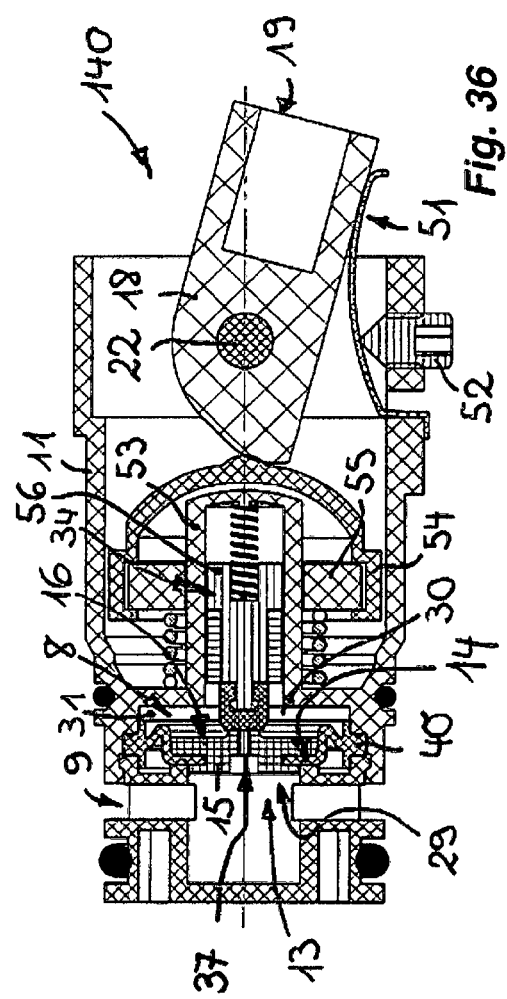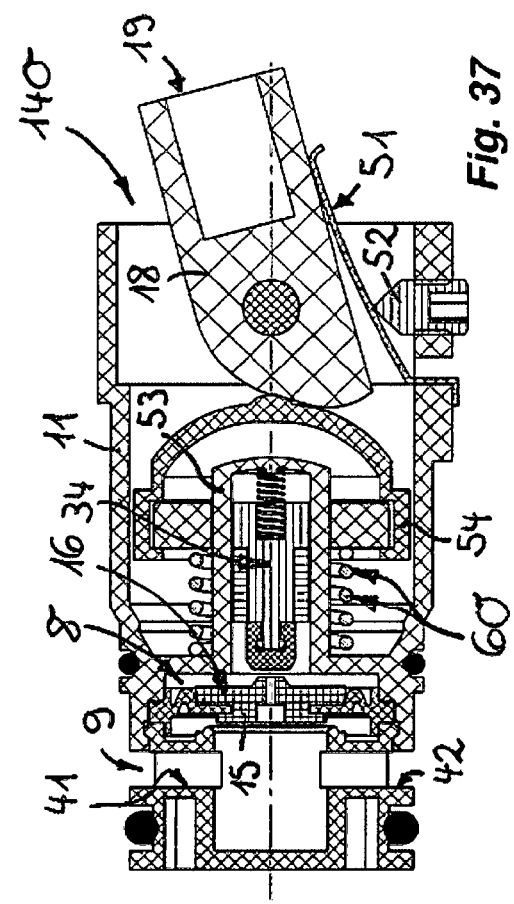

HAND-HELD SHOWER HOLDING DEVICE

BACKGROUND

The invention relates to a hand-held shower holding device which has a switch element having an actuation arm which on a first arm end supports a hand-held shower holder into which a hand-held shower is depositable and which under the load of a hand-held shower which is deposited in the hand-held shower holder is pivotable from a first actuation position into a second actuation position, wherein the switch element has a check valve which in the flow direction is upstream of a fluid outlet which leads to the hand-held shower and has a throughflow opening which delimits a valve seat which, in a closed position of the check valve is closed off by a valve closure, and wherein the actuation arm is provided for actuating the check valve.

Hand-held shower holding devices which as a substitute for a bidet are disposed and used in the region of a toilet, are already known. The previously known hand-held shower holding devices serve in providing a hand-held shower which is connected via a flexible hose line to the water supply system. A manually actuatable shower or bleeder valve which is openable for extracting water and subsequently closable again is integrated in the hand-held shower. The fitting body which is most often fastened on the wall beside a toilet bowl has a fork-shaped hand-held shower holder, through the fork opening of which the flexible hose line can be introduced in such a manner that the hand-held shower may subsequently be inserted in a standby position in the hand-held shower holder and deposited there until its next use.

In the case of such hand-held showers which are connected to the water supply via a flexible hose line there is, however, the risk of the hand-held shower being submerged in waste water and for such waste water in the case of corresponding pressure conditions subsequently making its way via the hand-held shower and the flexible hose line into the potable water supply system. In order to address this risk it is already known to dispose an upstream non-return device on the supply side of such hand-held showers, which non-return device prevents waste water being acquired by suction counter to the usual throughflow direction via the hand-held shower and which may be designed as a non-return valve, for example.

Even in embodiments which have been improved in this manner there is the risk that leakages may arise, in particular in the region of the flexible hose line which is prone to ruptures, and that inflowing water may subsequently flow out in an unimpeded manner, in particular when a supply valve which is integrated in the outlet fitting is not closed.

U.S. Pat. No. 2,364,491 A already discloses a hand-held shower holding device of the type mentioned at the outset, which has a switch element having an actuation arm which on a first arm end supports a hand-held shower holder into which a hand-held shower is depositable and which under the load of the hand-held shower which is deposited in the hand-held shower holder is pivotable from a first actuation position into a second actuation position. The switch element of the previously known hand-held shower holding device has a check valve which in the flow direction is upstream of a fluid outlet which leads to the hand-held shower and has a throughflow opening which delimits a valve seat which in a closed position of the check valve is closed off by a valve closure, wherein the actuation arm is provided for actuating the check valve.

In the hand-held shower holding device which has been previously known from U.S. Pat. No. 2,364,491 A1, the check valve represents a directly switching valve which is moved from its open position into the closed position by the weight alone of the hand-held shower which is deposited in the hand-held shower holder. However, the weight of a hand-held shower, in particular one made of plastic and of a correspondingly light weight, is hardly sufficient for keeping the check valve tight in its closed position, in particular not in the case of water flowing to the hand-held shower holding device being under high pressure. Rather, slight leakage flows which may also be acoustically perceptible by a high-pitched whistling noise are to be expected between the valve seat and the valve closure.

FR 1 216 187 A and EP 1 548 344 A1 already disclose various embodiments of a switch-over valve which is usable in a sanitary mixer tap in which, if and when required, hot and cold water is to be mixed in order to obtain water running out of the tap which is at the desired temperature. These previously known switch-over valves are not readily comparable to a hand-held shower holding device in which a check valve which is upstream of the fluid outlet is to be switched depending on whether a hand-held shower is deposited in a hand-held shower holder.

SUMMARY

The object thus particularly exists for a sanitary hand-held shower holding device of the type mentioned at the outset to be provided, in which a safety function or else another function may be made dependent on whether the hand-held shower has been deposited in the hand-held shower holder.

The achievement of this object according to the invention, in the case of the hand-held shower holding device of the type mentioned at the outset, particularly lies in that a first fluid duct is provided in the valve closure of the check valve, said first fluid duct connecting the first valve side which faces the throughflow opening to a chamber which is disposed on a second valve side which faces away from the throughflow opening, in that an actuation slide which is guided in a slide housing so as to be displaceable in the slide longitudinal direction is provided in the switch element, and which in a sliding position of the actuation slide which is advanced in the direction toward the actuation arm releases at least one outlet opening which connects the chamber to the fluid outlet, in that the actuation arm and the actuation slide are magnetically interlinked in a controlling connection through the slide housing, and in that the part-region of the first valve side which in the closed position of the check valve is delimited by the valve seat is smaller in comparison with the second valve side which faces the chamber.

The hand-held shower holding device according to the invention has a switch element having an actuation arm which is conceived for actuating the switch element. The actuation arm, which on a first arm end supports the hand-held shower holder, under the load of a hand-held shower which is deposited in the hand-held shower holder is pivotable from a first actuation position into a second actuation position.

In order for the hand-held shower holding device according to the invention to be able to offer the highest possible operational safety and thus for the damage caused by leakages in the region of the hose line to be able to be effectively suppressed with the aid of the hand-held shower holding device according to the invention, it is provided according to the invention that the switch element has a check valve which in the flow direction is upstream of a fluid outlet which leads to the hand-held shower. This check valve has a throughflow opening which delimits a valve seat which in a closed position of the check valve is closed by a valve closure, wherein the actuation arm is provided for actuating the check valve. A first fluid duct which connects the first valve side which faces the throughflow opening to a chamber which is disposed on second valve side which faces away from the throughflow opening is provided, wherein in the switch element an actuation slide is guided so as to be displaceable in the slide longitudinal direction, which actuation slide in a sliding position of the actuation slide which is advanced in the direction toward the actuation arm releases at least one outlet opening which connects the chamber to the fluid outlet, and wherein that part-region of the first valve side that in the sliding position of the check valve is delimited by the valve seat is smaller in comparison with the second valve side which faces the chamber. The check valve of the hand-held shower holding device according to the invention in the flow direction is upstream of the fluid outlet which leads to the hand-held shower. A manually openable and closable shower valve is preferably provided in the hand-held shower. The throughflow opening which is provided in the check valve of the hand-held shower holding device according to the invention is delimited by a valve seat which, in a closed position of the check valve, is closed off by a valve closure, such that in this closed position of the check valve uncontrolled outflow of water which is located in the water supply system may be effectively prevented. In order for the check valve to be actuated an actuation arm which on a first arm end supports the hand-held shower holder is provided. Under the load of a hand-held shower which until its next use is deposited in the hand-held shower holder, the actuation arm may be pivoted counter to a restoring force. A first fluid duct which connects the first valve side which faces the throughflow opening to a chamber which is disposed on the second valve side which faces away from the valve opening is provided in the valve closure of the check valve. An actuation slide, which is displaceably guided in the slide longitudinal direction and the slide end of which that faces the actuation arm bears in a controlling connection on a switching cam which is provided on the second arm end of the actuation arm, is provided in the hand-held shower holding device. In a sliding position of the actuation slide which is advanced in the direction toward the actuation arm, said actuation slide releases at least one outlet opening which connects the chamber to the fluid outlet. In the case of an opened check valve, water in a first part-flow may directly flow through the throughflow opening to the fluid outlet and in a second part-flow via the first fluid duct and the chamber to the at least one outlet opening, and from there likewise to the fluid outlet. In the case of a closed check valve, the valve closure which tightly bears on the valve seat suppresses the first part-flow. Water coming from the water supply system is under the same pressure both on the first valve side as well as—via the first fluid duct—on the second valve side. Since the part-region of the first valve side which in the closed position of the check valve is delimited by the throughflow opening is smaller in comparison with the second valve side which faces the chamber, the valve closure is tightly held on the valve seat until the pressure prevailing in the chamber is reduced via the at least one outlet opening which is openable and closable by means of the actuation slide. The valve closure is thus also tightly pressed against the valve seat in a hydraulic manner once the actuation slide has closed off the at least one outlet opening. Since the valve closure even tightly bears on the valve seat when a leakage arises in the region of the hose line which leads to the hand-held shower, a leakage in the region of the hand-held shower holding device according to the invention is effectively avoided as long as the actuation arm has not yet released the slide path of the actuation slide in the direction toward the actuation arm and the actuation slide has not opened the flow path leading to the fluid outlet by opening the at least one outlet opening. In order to be able to separate the functional region of the actuation slide from the functional region of the actuation arm and in order to simultaneously limit the number of required seals, it is provided according to the invention that the actuation slide is displaceably guided in a slide housing, wherein the actuation arm and the actuation slide are magnetically interlinked in a controlling connection through the slide housing.

In order for the switch element to be able to switch between a first and a second actuation position, depending on whether or not a hand-held shower has been deposited in the hand-held shower holder, it is advantageous for the actuation arm to be pivotable into the second actuation position counter to the restoring force of at least one restoring element.

The switch element collaborating with the hand-held shower holding device according to the invention may be an electric, magnetic, hydraulic, or mechanical switch element, or a combination thereof.

It is particularly advantageous for the switch element to be conceived for releasing the throughflow to the hand-held shower, and in particular for the switch element to release the throughflow to the hand-held shower in the first actuation position of the actuation arm.

In order to convert the pivoting movement on the actuation arm into a switching movement on the actuation slide, it is advantageous for the actuation slide by way of its slide end which faces the actuation arm to bear in a controlling connection on a switching cam which is provided on the second end of the actuation arm.

Here, the slide housing may tightly enclose the actuation slide. It is advantageous here for the slide housing on the outer circumferential side to be encompassed by at least one retaining ring, for at least one permanent magnet which interacts with a ferromagnetic counterpiece on the in each case other component to be provided on the retaining ring or on the actuation slide, and for a pivoting movement on the actuation arm to be convertible into a sliding movement of the retaining ring which is displaceably guided on the slide housing.

In order for the check valve in the closed position to be able to seal in a good manner in the region of its valve seat, a seal which in the closed position of the check valve is disposed between the valve closure and the valve seat is provided.

Here, an embodiment in which the seal is made from an elastic material is preferable.

A preferred refinement according to the invention provides that the valve closure has a valve-closure membrane which separates the first valve side from the second valve side. This valve-closure membrane, by way of its outer membrane circumference, may be tightly held on the inner circumference of a valve housing.

It is advantageous for the valve-closure membrane to be configured as an annular disk, the inner annular zone of which that preferably bears on the valve closure being configured as a seal, and the outer annular zone of which being held on the inner housing circumference of the check-valve housing. In this embodiment, the fluid flow which leads through the opened valve seat of the check valve to the fluid outlet, on the one hand, and the flow path which leads through the first fluid duct and the chamber via the at least one outlet opening, on the other hand, may be separated from one another in a tight and low-maintenance manner.

One preferred embodiment according to the invention provides that the outer annular zone of the valve-closure membrane which is configured as an annular disk is clamped in an encircling and tight manner between two housing parts of the check-valve housing.

In order for the first valve side which faces the throughflow opening to be connected to the chamber which is disposed on the second valve side which faces away from the throughflow opening, it is advantageous for the first fluid duct which is provided in the valve closure to be configured as a central fluid duct or to be provided in the valve-closure membrane of the valve closure.

In order for the valve closure in the closed position of the check valve to be able to seal the valve seat in a good manner, it is advantageous for the valve closure to have a valve plate which impinges the valve seat in the closed position.

One exemplary embodiment of the hand-held shower holding device according to the invention provides that the outlet opening is designed as a throughflow opening which is disposed in a chamber wall, and that the actuation slide in a sliding position which is retracted in the slide direction which faces away from the actuation arm tightly closes off the outlet opening. Since the actuation slide in a sliding position which is retracted in a slide direction which faces away from the actuation arm tightly bears on the outlet opening, the friction forces which are caused by a sliding movement and which act on any potential annular seals are reduced, benefiting the functional reliability of the check valve which is provided in the hand-held shower holding device according to the invention.

By contrast thereto, another exemplary embodiment according to the invention provides that a second fluid duct is provided in the actuation slide, which has at least one inlet opening which is disposed in the region of the chamber, and the at least one outlet opening which in a sliding position of the actuation slide which is advanced in the direction toward the actuation arm connects the first fluid duct via the second fluid duct to the fluid outlet.

According to one exemplary embodiment of the invention it is provided that the actuation slide is designed in a rod-shaped manner and on the end side which faces the chamber has the at least one inlet opening, and that the at least one outlet opening is provided on the circumferential side on the actuation slide.

By contrast thereto, another exemplary embodiment according to the invention provides that the actuation slide is configured so as to be at least bipartite and has two slide parts which are guided so as to be independently displaceable of one another, that the first slide part which faces the chamber on the end side has the inlet opening of the second fluid duct which penetrates the first slide part, that the second slide part which faces away from the chamber by way of its end side which faces the first slide part in the closed position of the check valve tightly closes off the second fluid duct, and that in a sliding position of the second slide part of the actuation slide, which is advanced in the direction toward the switching cam, the slide parts are spaced apart from one another while forming a gap which is provided as an outlet opening.

In order for the actuation arm to be able to be pivoted into an upper pivot position when the hand-held shower is removed from the hand-held shower holder, it is advantageous for the actuation arm to be pivotable counter to the restoring force of at least one restoring element into the second actuation position.

Here, an embodiment according to the invention which is simple in construction and easy to manufacture provides that the restoring element is configured as a flexible tongue, which flexible tongue by way of a free tongue-end region impinging the actuation arm.

In order for the restoring force which is exerted on the actuation arm to be able to be modified and adapted to the weight of the hand-held shower, it is advantageous for the flexible tongue on its flexible-tongue side which faces away from the actuation arm to be impinged by a set screw, and for pretensioning of the flexible tongue to be modifiable by means of the set screw.

According to another advantageous exemplary embodiment according to the invention it may additionally thereto or instead thereof be provided that the at least one restoring element which acts on the actuation arm is designed as a leg spring or a similar spring element. This leg spring may be disposed so as to be lateral to the actuation arm, for example, and be pushed onto the pivot axle of the latter.

It may be expedient for a reliable functioning of the actuation arm for the at least one spring element to act with pretensioning on the actuation arm, and for pretensioning of the at least one spring element which acts on the actuation arm preferably to be modifiable. Since pretensioning of the at least one spring element which acts on the actuation arm may be modifiable, it is possible for pretensioning of the spring element and thus also of the restoring force thereof which acts on the actuation arm to be adapted to the weight of the respectively used hand-held shower.

One preferred embodiment according to the invention provides that a plurality of engagement points are provided on the actuation element so as to be laterally disposed thereon preferably on a circular path about the pivot axle, the at least one spring element selectively engaging on said engagement points.

The pressure which acts so as to emanate from the chamber onto the actuation slide in the direction toward the actuation arm should per se be sufficient for displacing the actuation slide in the direction toward the switching cam. However, should the forces which are exerted by the annular seals in the region of the actuation slide be excessive, it is possible for the sliding movement of the actuation slide which is oriented in the direction toward the actuation arm to be supported by a restoring force. One embodiment of the invention thus provides that the actuation slide is displaceably guided from a sliding position which is advanced toward the actuation arm counter to a restoring force into a sliding position which is retracted in the direction which faces away from the actuation arm.

BRIEF DESCRIPTION OF THE DRAWINGS

Refinements according to the invention are derived from the claims in conjunction with the drawing and the following description of the figures, in which:

FIG. 1 shows a hand-held shower holding device which is integrated in a corner valve and here is illustrated in the longitudinal section, and which comprises an actuation arm which is conceived for actuating a switch element, which actuation arm on its one arm end supports a hand-held shower holder in which a hand-held shower which is usable for example as an upwardly directed shower head or which is referred to as a so-called "shattaf shower" can be deposited, said hand-held shower being connected via a flexible hose line to the hand-held shower holding device which is designed as a corner valve, wherein the hand-held shower here is shown in the standby position in which the hand-held shower in the hand-held shower holder is ready for application;

FIG. 2 shows the hand-held shower holding device from FIG. 1 in a use position of the hand-held shower, in which the hand-held shower has been removed from the hand-held shower holder;

FIG. 5 shows the switch element from FIGS. 3 and 4 in a longitudinal section, wherein a check valve which is located therein is in its closed position;

FIG. 6 shows the switch element from FIGS. 1 to 5, with its check valve which here is shown in the open position;

FIG. 7 shows the switch element according to FIGS. 3 to 6 in an exploded perspective view of its components;

FIG. 8 shows an embodiment, which is slightly modified in relation to FIGS. 3 to 7, of the switch element conceived for the hand-held shower holding device shown in FIGS. 1 and 2 in the closed position of the check valve;

FIG. 9 shows the switch element from FIG. 8, in the open position of its check valve;

FIG. 10 shows an embodiment of the switch element which is slightly modified in relation to FIGS. 3 to 9, in the closed position of the check valve of said switch element;

FIG. 11 shows the switch element from FIG. 10, in the open position of its check valve;

FIG. 18 shows a further switch element in a modified embodiment, in a longitudinal section, in the closed position of the check valve of said switch element;

FIG. 19 shows the switch element from FIG. 18, in a longitudinal section which is rotated by 90° in the circumferential direction;

FIG. 19a shows the switch element from FIGS. 18 and 19 in a detailed illustration, in the region of a first fluid duct;

FIG. 20 shows the switch element from FIGS. 18 and 19, in the open position of the check valve;

FIG. 21 shows the switch element from FIGS. 18 to 20, in the longitudinal section which is rotated by 90° in the circumferential direction;

FIG. 22 shows a further switch element in a modified embodiment, in a longitudinal section, in the closed position of the check valve of said switch element;

FIG. 23 shows the switch element from FIG. 22, in a longitudinal section which is rotated by 90° in the circumferential direction;

FIG. 24 shows the switch element from FIGS. 22 and 23, in the open position of the check valve;

FIG. 25 shows the switch element from FIGS. 22 to 24, in the longitudinal section which is rotated by 90° in the circumferential direction;

FIG. 26 shows a further switch element in a modified embodiment, in a longitudinal section, in the closed position of the check valve of said switch element;

FIG. 27 shows the switch element from FIG. 26, in a longitudinal section which is rotated by 90° in the circumferential direction;

FIG. 28 shows the switch element from FIGS. 26 and 27, in the open position of the check valve;

FIG. 29 shows the switch element from FIGS. 26 to 28, in the longitudinal section which is rotated by 90° in the circumferential direction;

FIG. 30 shows a further switch element which is longitudinally sectioned, in the closed position of its check valve, wherein a pivoting movement on the actuation arm of the hand-held shower holding device is transferable in a magnetically linked manner to the switch element;

FIG. 31 shows the switch element from FIG. 30, in the open position of its check valve;

FIG. 32 shows the switch element from FIGS. 30 and 31 in a longitudinal section which in relation to FIG. 35 is rotated by 90°;

FIG. 33 shows the switch element from FIGS. 30 to 32 which here is integrated in a corner valve, having the hand-held shower holder which here is located in the closed position and is conceived for receiving a hand-held shower (not shown in more detail);

FIG. 34 shows the corner valve equipped with the switch element from FIGS. 30 to 33, having the hand-held shower holder which here is located in the unstressed open position;

FIG. 36 shows a further switch element which is longitudinally sectioned, in the closed position of its check valve, in which a pivoting movement on the actuation arm of the hand-held shower holding device is transferable in a magnetically linked manner to the switch element, a restoring element which attempts to move back the switch element into its open position acting on said switch element;

FIG. 37 shows the switch element from FIG. 36 in the open position of its check valve;

DETAILED DESCRIPTION OF THE PREFERRED EMBODIMENTS

Figure 4:
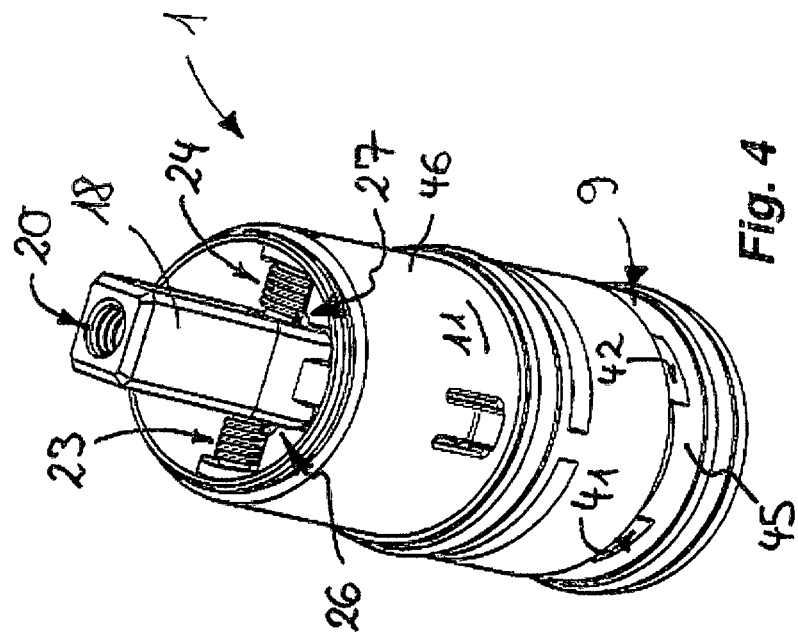
FIG. 4 shows the switch element from FIG. 3, which is conceived for the hand-held shower holding device according to FIGS. 1 and 2, in a perspective view which is modified in relation to FIG. 3, wherein a cover which is placeable onto the switch element on the end side has been removed.
Figure 3:
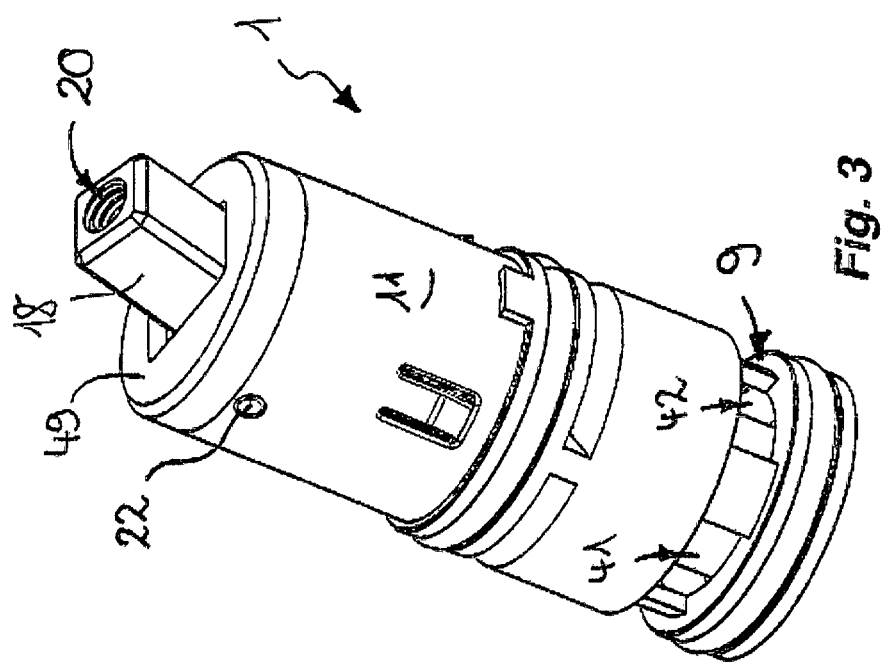
FIG. 3 shows the switch element of the hand-held shower holding device from FIGS. 1 and 2, in a perspective view.
Figure 12:
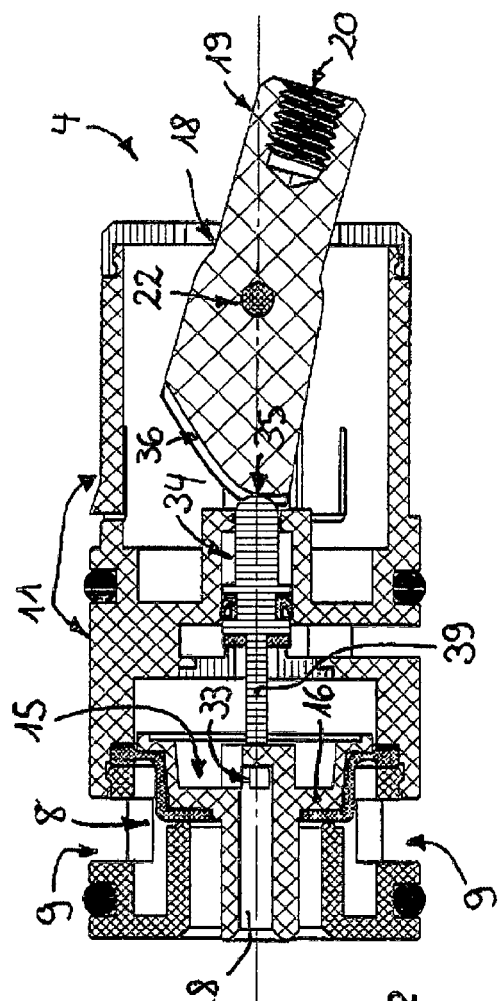
FIG. 12 shows an exemplary embodiment, which is modified in relation to FIGS. 3 to 11, of the switch element conceived for the hand-held shower holding device according to FIGS. 1 and 2, in the closed position of the check valve located therein.
Figure 13:
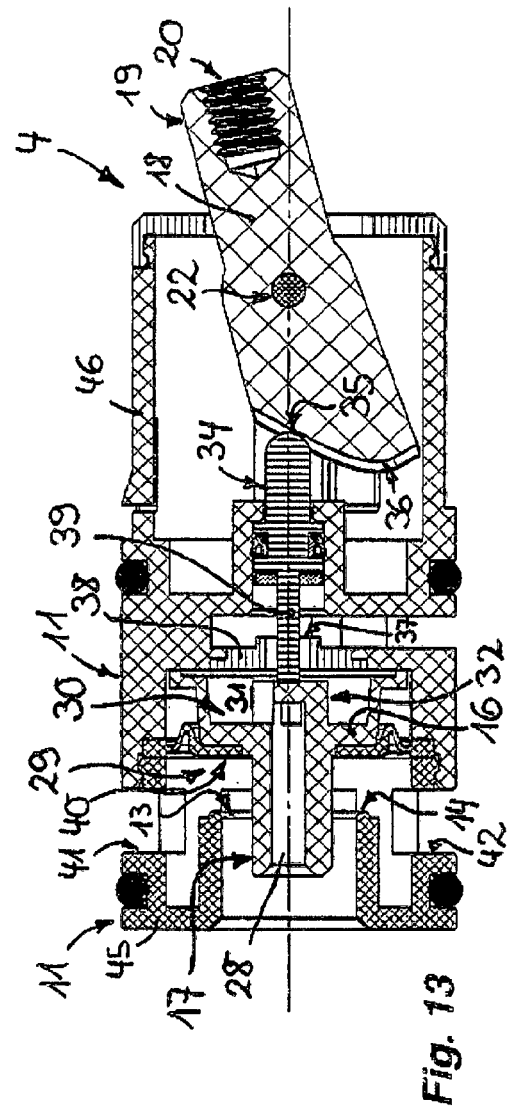
FIG. 13 shows the switch element from FIG. 12, in the open position of the check valve.
Figure 14:
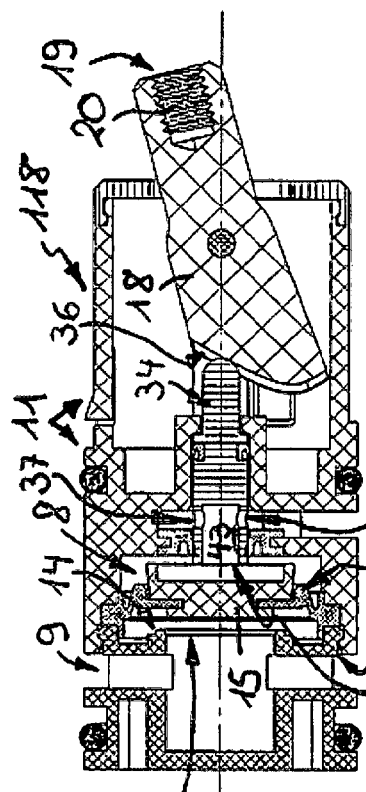
FIG. 14 shows a further switch element in a modified embodiment, in a longitudinal section, in the closed position of the check valve of said switch element.
Figure 15:
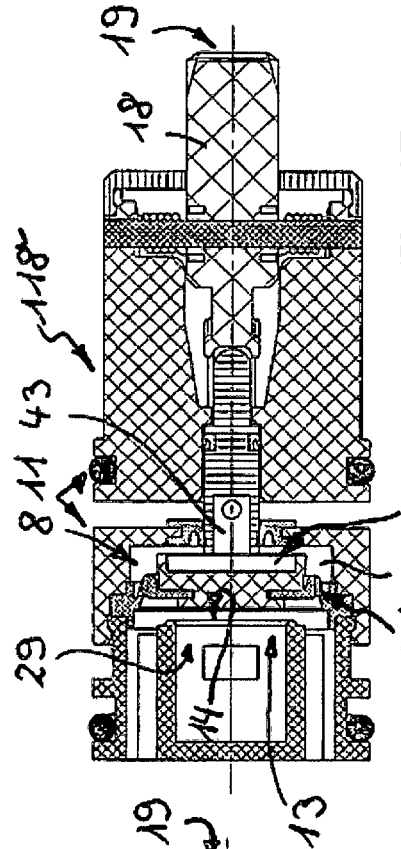
FIG. 15 shows the switch element from FIG. 14, in a longitudinal section which is rotated by 90° in the circumferential direction.
Figure 16:
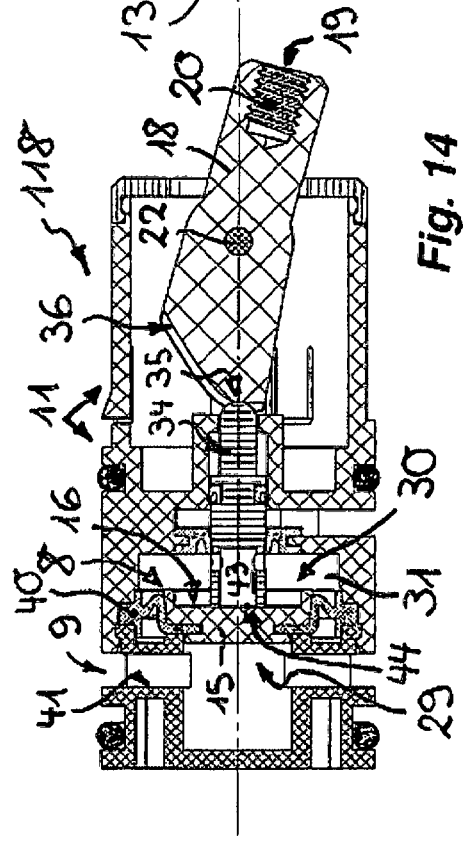
FIG. 16 shows the switch element from FIGS. 14 and 15, in the open position of the check valve.
Figure 17:
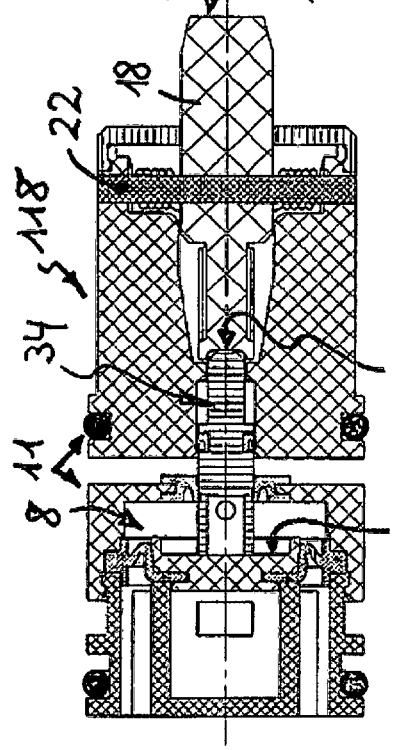
FIG. 17 shows the switch element from FIGS. 14 to 16, in the longitudinal section which is rotated by 90° in the circumferential direction.
Figure 35:
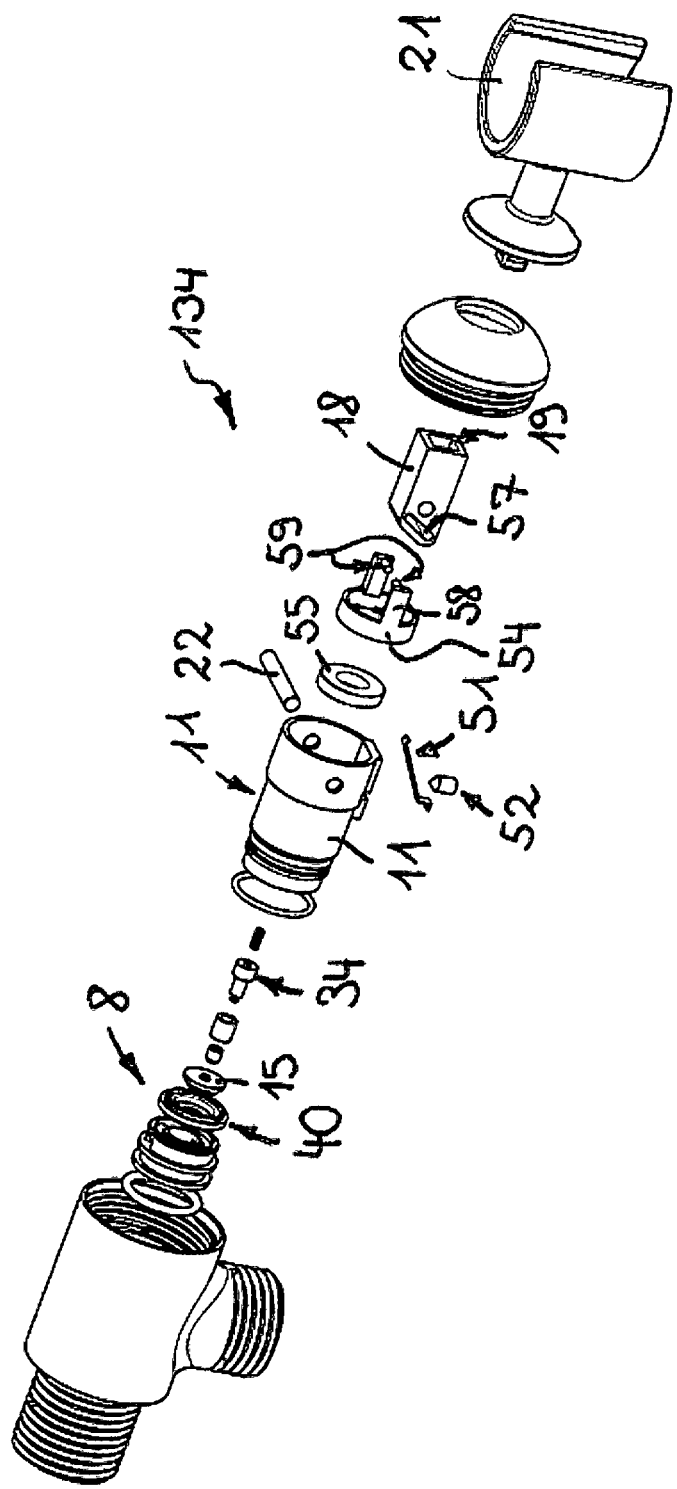
FIG. 35 shows the switch element from FIGS. 30 to 34, in an exploded illustration of the individual parts.
Figure 38:
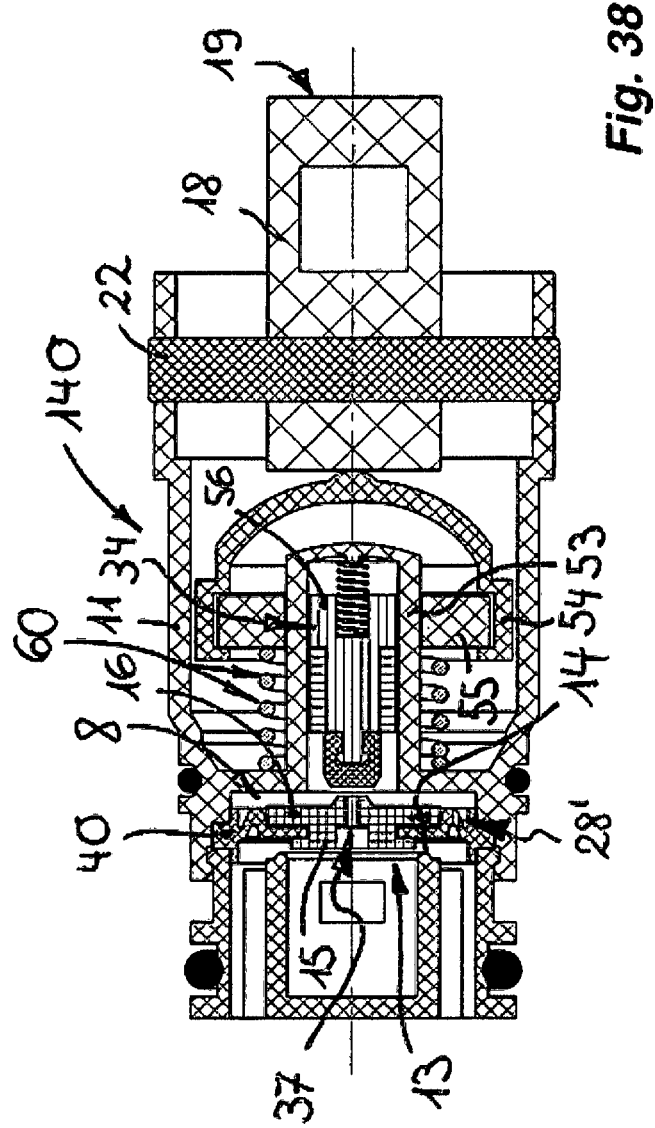
FIG. 38 shows the switch element from FIGS. 36 and 37, in a longitudinal section which in relation to FIG. 37 is rotated by 90°.
Figure 39:
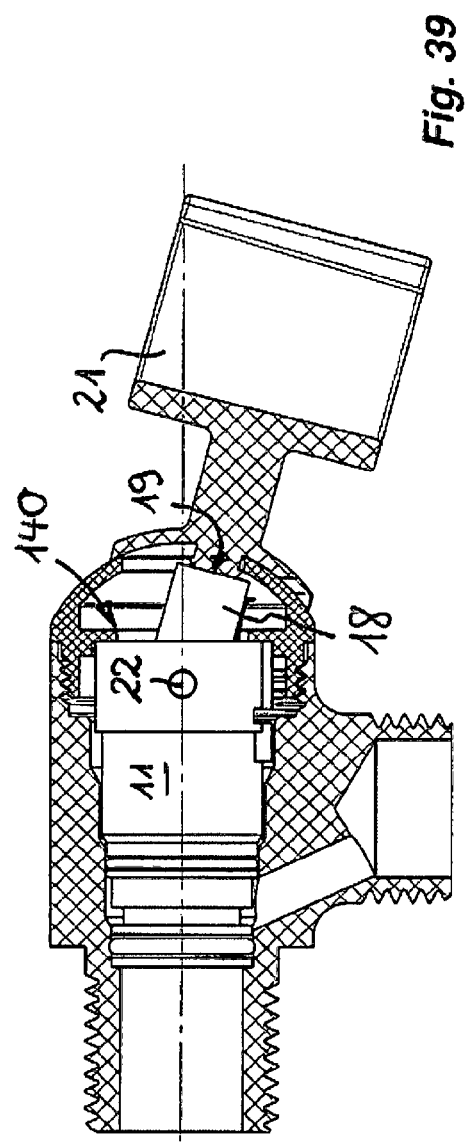
FIG. 39 shows the switch element from FIGS. 36 to 38, which here is integrated in a corner valve, having the hand-held shower holder which here is located in the closed position.
Figure 40:
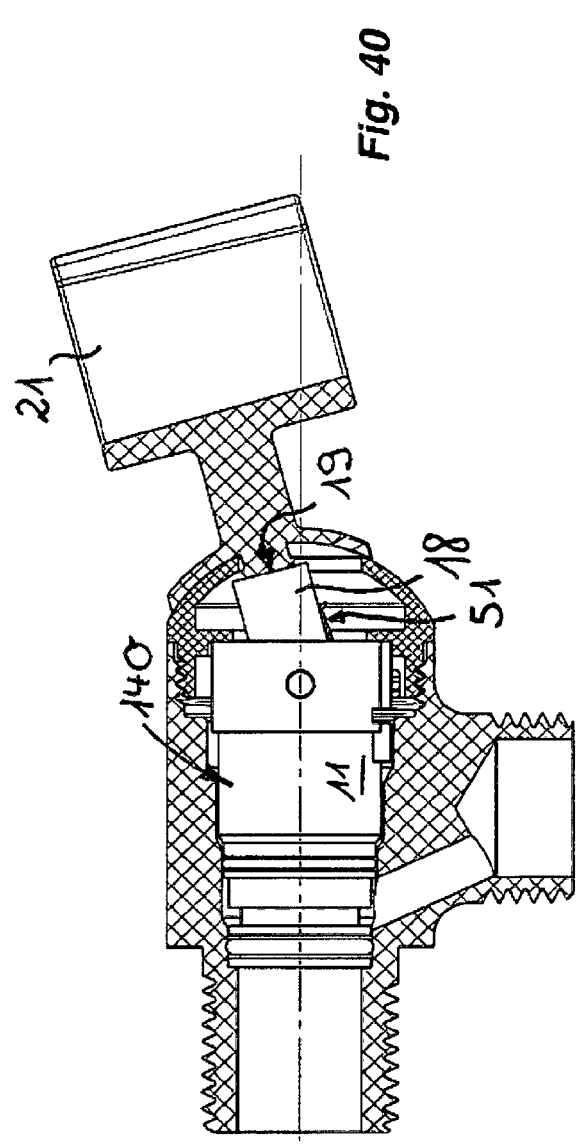
FIG. 40 shows the corner valve equipped with the switch element from FIGS. 36 to 39, having the hand-held shower holder which here is located in the unstressed open position.
Figure 41:
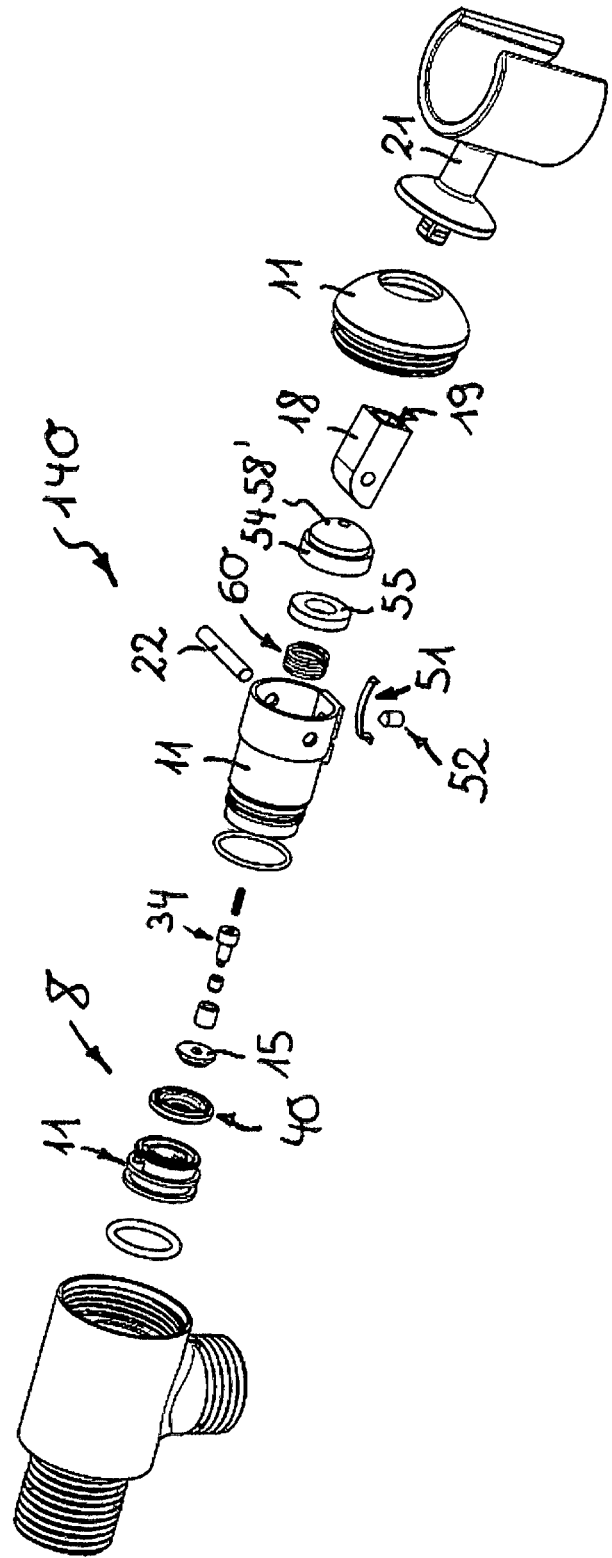
FIG. 41 shows the switch element from FIGS. 36 to 40 in an exploded illustration of its individual parts.

In FIGS. 1, 2, 33, 34, 39, and 40 a hand-held shower holding device having a hand-held shower holder 21 is illustrated, in which hand-held shower holder 21 a hand-held shower 5 can be deposited. The hand-held shower holding device shown in FIGS. 1, 2, 33, 34, 39, and 40 has a switch element which is illustrated in more detail in FIGS. 1 to 41 by means of various exemplary embodiments 1, 2, 3, 4, 118, 122, 126, 130, 134, and 140. The switch element 1, 2, 3, 4, 118, 122, 126, 130, 134, and 140 has an actuation arm 18 which is conceived for actuating the switch element and which on a first arm end 18 supports the hand-held shower holder 21. This actuation arm 18 under the load of the hand-held shower 5 which is deposited in the hand-held shower holder 21 is pivotable into a first actuation position.

The switch element which interacts with the hand-held shower holding device and which may also be configured as an electrical switch element, here is designed as a mechanical switch element which from a first actuation position shown in FIGS. 2, 6, 16, 17, 20, 21, 24, 25, 28, 39, 31, 32, 34, 37, 38, and 40 is pivotable counter to a restoring force into the second actuation position illustrated in FIGS. 1, 5, 8, 10, 12, 14, 15, 18, 19, 22, 23, 26, 27, 30, 33, 36, and 39. In the first and thus upper pivot position the switch element 1, 2, 3, 4, 118, 122, 126, 130, 134, 140 releases the throughflow to the hand-held shower 5.

The switch element 1, 2, 3, 4, 118, 122, 126, 130, 134, and 140 has a check valve 8 which is upstream of a fluid outlet 9 which via a flexible hose line 10 leads to the hand-held shower 5. The check valve 8 is provided in a valve housing 11. The check valve 8 has a throughflow opening 13 which delimits a valve seat 14.

As becomes evident in FIGS. 5, 8, 10, 14, 15, 18, 19, 22, 23, 26, 27, 30, and 36, the valve seat 14 in a closed position of the check valve 8 is closed off by a valve closure 15. This valve closure 15 has a valve plate 16 which in the closed position impinges the valve seat 14.

The actuation arm 18, which on its first arm end 19 supports a thread 20 on which a mating thread of the hand-held shower holder 21 which here is fork-shaped may be mounted, is provided for actuating the check valve 8. The actuation arm 18 is mounted so as to be pivotable about a pivot axle 22, which is provided so as to be spaced apart from the arm ends and preferably disposed so as to be approximately centrical, in such a manner that the actuation arm 18 under the load of the hand-held shower 5 which is deposited in the hand-held shower holder 21 is pivotable counter to a restoring force.

The restoring force may be generated, for example, by the leg springs 23, 24 which are identifiable in FIG. 4 and here are disposed on both sides of the actuation arm 18 on the pivot axle 22. Here, the engagement of the leg springs 23, 24 on the actuation arm 18 is modifiable in such a manner that the restoring force may be adapted to the weight of the hand-held shower 5, for example. To this end, the actuation arm 18 has fastening openings 25 which are disposed on a circular path around the pivot axle 22 and in which the corresponding and in this case angular spring end 26, 27 of the leg springs 23, 24 can selectively engage.

In FIGS. 30, 31, 35, 36, 37, and 41, the actuation arm 18 is pivotable counter to the restoring force of a restoring element which is configured as a flexible tongue 51. This flexible tongue 51 which serves as a restoring element by way of its tongue-end region which faces away from the actuation arm 18 is held on the valve housing 11, while the other free tongue-end region impinges the actuation arm 18. The flexible tongue 51 here, on its flexible-tongue side which faces away from the actuation arm 18, is impinged by a set screw 52, by means of which pretensioning of the flexible tongue 51 may be modified.

A first fluid duct 28, 28', which connects the first valve side 29 which faces the throughflow opening 13 to a chamber 31 which is disposed on the second valve side 30 which faces away from the throughflow opening 13, is provided in the valve closure 15. It can be seen in the longitudinal sections according to FIGS. 5, 6, 8 to 32, and 36 to 38 that the valve closure 15 has a valve-closure membrane 40 of an elastic or shape-modifiable material, which separates the first valve side 29 from the second valve side 30. The valve-closure membrane 30, by way of its outer membrane circumference, is tightly held on the inner circumference of the valve housing 11. In order for the first valve side 29 which faces the throughflow opening 13 to be connected to the chamber 31 which is disposed on the second valve side 30 which faces away from the throughflow opening 13, a first fluid duct 28, 28' is provided in the valve closure 15. This fluid duct 28' may be provided in the valve-closure membrane 40 of the valve closure 15, as is shown in an exemplary manner in FIGS. 15, 17, 19, 21, 23, 25, 27, and 29.

In another embodiment which differs therefrom and which is shown in FIGS. 5, 6, 8, 9, 10, 11, 12, 13, 32, and 38, the fluid duct 28 is configured as a central fluid duct which penetrates the valve plate 16. In the embodiment shown in FIGS. 5, 6, 8, 9, and 10 to 13, this fluid duct 28 has a duct opening which is disposed on the inflow-side end side of the valve plug 17, penetrates the valve plug 17 in the plug longitudinal direction and on the second valve side 30 opens into a central valve protrusion 32 on which the duct opening 33 which forms the outlet of the first fluid duct 28 is disposed so as to be lateral on the valve protrusion 32.

An actuation slide 34 is guided in the valve housing 11 so as to be displaceable in the slide longitudinal direction. In order to be able to convert a pivoting movement of the actuation arm 18 into a sliding movement of the actuation slide 34, it is provided in the exemplary embodiments shown in FIGS. 5, 6, 7, 13, and 14 to 29 that that slide end 35 of the actuation slide 34 that faces the actuation arm 18 and here is rounded in the shape of a spherical cap bears in a controlling connection on a switching cam 36, which switching cam 36 is provided on the second arm end of the actuation arm 18. As can be seen in FIGS. 6, 9, 11, 13, 16, 20, 24, and 28, the actuation slide 34 in its upper first actuation position releases an outlet opening 37 which connects the chamber 31 to the fluid outlet 9.

In the exemplary embodiments of the switch elements 3, 4, 122, and 126, which are shown in FIGS. 10, 11, 12, 13, and 18 to 25, the outlet opening 37 is designed as a throughflow opening which is disposed in a chamber wall 38 and which in a sliding position of the actuation slide 34 which is retracted in the slide direction which faces away from the actuation arm 18 is tightly closed off by said actuation slide 34. As becomes evident from a comparison of FIGS. 12, 13, and 22 to 25, a connection plug 39, which penetrates the outlet opening 37 and transmits the sliding movement of the actuation slide 34 and the opening movement of the valve closure 15 to the in each case other component 15, 34 may be provided either on the actuation slide 34 or on the valve closure 15, additionally thereto or instead thereof, respectively.

Two switch elements 134, 140 in which the actuation slide 34 is displaceably guided in a slide housing 53 are shown in FIGS. 30 to 41. The actuation arm 18 and the actuation slide 34 are magnetically interlinked through the slide housing 53 in the manner of a controlling connection. To this end, the slide housing 53 on the outer circumferential side is encompassed by at least one retaining ring 54, wherein on the retaining ring 54 or on the actuation slide 34 at least one permanent magnet 55 which interacts with a ferromagnetic counterpiece 56 on the in each case other component 34, 54, is provided. In this way, a pivoting movement on the actuation arm 18 is convertible into a sliding movement of the actuation slide 34 which is displaceably guided in the slide housing 53.

The switch element 134 has an actuation arm 18 which on its arm end which faces away from the hand-held shower holder 21 has a guide groove 57 which serves as a gate-type guide. A retaining-ring bracket 58 which together with a guide web 59, which is molded on the former and serves as a sliding block, engages in the guide groove 57 is molded on the retaining ring 54. The gate-type guide which is provided between the actuation arm 18 and the retaining ring 54 thus converts a pivoting movement on the actuation arm 18 into a sliding movement of the retaining ring 54 and of the actuation slide 34 which is magnetically linked in the manner of a controlling connection to said retaining ring 54.

It can be seen in FIGS. 30 to 32 that the actuation slide 34 is pushed into the closed position of the valve closure 15 by means of the restoring force of at least one restoring element 61 which here is configured as a compression spring, in which closed position the actuation slide 34 seals the outflow-side duct opening of the first fluid duct 28. To this end, a seal 62 which here is configured as a seal cap made of an elastic material is placed on the slide end of the actuation slide 34 which faces the first fluid duct 28.

The switch element 140 has a retaining ring 54 with a retaining-ring cap 58', which retaining-ring cap 58' is directly impinged by the arm end of the actuation arm 18 which faces away from the hand-held shower holder 21. Here, the retaining ring 54 is impinged by a restoring element which here is configured as a compression spring 60, said restoring element 60 enclosing the slide housing 53 and being supported on the slide housing 53. The restoring element 60 attempts to hold the retaining ring 54 in the sliding position which corresponds to the open position. If the actuation arm 18 is pivoted downward by the weight of a hand-held shower which is placed in the hand-held shower holder 21, the actuation arm 18 counter to the restoring force of the restoring element 60 pushes the retaining-ring cap 58' into the closed position, wherein the sliding movement of the retaining ring 54 which is displaceably guided on the slide housing 53 is transmitted in a magnetically linked manner also onto the actuation slide 34.

FIGS. 14, 18, 19, 22, 23, 26, 27, and 30, and 36 show the check valve 8 in the closed position. By contrast, the check valve 8 is illustrated in the open position in FIGS. 16, 17, 20, 21, 24, 25, 28, 29, 31, and 37.

In order to ensure a tight closure of the check valve 8 in the closed position, a seal which in the closed position of the check valve 8 is disposed between the valve closure 15 and the valve seat 14 is provided. The elastic valve-closure membrane 40 may serve as a seal ring here, which separates the fluid outlet 9 from the chamber 31 in the region which is disposed between the valve closure 15 and the valve housing 11.

By contrast, a second fluid duct 43 is provided in the actuation slide 34 in the exemplary embodiments 1, 2, 118 shown in FIGS. 5, 6, 8, 9, and 14 to 17, which fluid duct 43 has an inlet opening 44, which is always provided in the region of the chamber 31, and the at least one fluid outlet 37 which in the sliding position of the actuation slide 34 which is advanced in the direction toward the actuation arm 18 connects the first fluid duct 28' via the second fluid duct 43 to the fluid outlet 9.

In the exemplary embodiment shown in FIGS. 5, 6, and 14 to 17, the actuation slide is configured as a unipartite sliding plug which on its end side which faces away from the actuation arm 18 has the inlet opening 44 of the second fluid duct 43 which extends across a part-portion of the actuation slide 34. This second fluid duct 43 opens into at least one and preferably into at least two outlet openings 37 which are disposed on the slide circumference of the actuation slide 34 of the check valve 1.

In the exemplary embodiment 2, 130 shown in FIGS. 8 and 9 and in FIGS. 26 to 29, the actuation slide 34 is designed so as to be at least bipartite and has two slide parts 47, 48 which are guided in the valve housing 11 so as to be independently displaceable of one another. While the inflow-side slide part 47 is penetrated by the second fluid duct 43 which on the end sides of the slide part has its inlet opening 44 and its outlet openings 37, the second slide part 48 in the retracted sliding position shown in FIGS. 8, 26, and 27 tightly closes off the outlet openings 37, in order to by contrast release these outlet openings in the sliding position shown in FIGS. 9, 28, and 29 in relation to the fluid outlet 9.

In the exemplary embodiments 1, 2, 3, 4, 118, 122, 126, 130, 134, and 140 of the switch element which are illustrated here, the actuation slide 34 conjointly acts with the at least one outlet opening 37 in practical terms as a multiway valve.

In the case of an opened check valve 8, water flowing to the switch element 1, 2, 3, 4, 118, 122, 126, 130, 134, and 140 may flow through the throughflow opening 13 to the fluid outlet 9 and from there, via the hose line, to the hand-held shower 5, where water is retrievable by actuating the shower valve 6 which is provided in the hand-held shower 5. A part-quantity of water flowing to the hand-held shower unit flows through the first fluid duct 28, 28', from the first valve side 29 of the check valve 8 to the chamber 31 which is provided on the second valve side 30. In the case of a closed check valve 8, the valve closure 15 which tightly bears on the valve seat 14 suppresses the first part-flow. Water coming from the water supply system is under the same pressure, both on the first valve side 29 as well as—via the first fluid duct 28, 28'—on the second valve side 30. Since the part-region of the first valve side 29 that in the closed position of the check valve 8 is delimited by the throughflow opening 13 is smaller in comparison with the second valve side 30 which faces the chamber 31, the valve closure 15 is tightly held on the valve seat 14 until the pressure prevailing in the chamber 31 is reduced via the at least one outlet opening 37 which is openable and closable by means of the actuation slide 34. The valve closure 15 is thus also tightly pressed against the valve seat 14 in a hydraulic manner once the actuation slide 34 has closed off the at least one outlet opening 37. Since the valve closure 15 tightly bears on the valve seat 14 even when a leakage arises in the region of the hose line 10 which leads to the hand-held shower 5, as long as the actuation arm 18 has not yet released the sliding path of the actuation slide 34 in the direction toward the actuation arm 18 and the actuation slide 34 has not opened the flow path which leads to the fluid outlet 9 by opening the at least one outlet opening 37, uncontrolled leakage in the region of the hose line 10 which leads to the hand-held shower 5 is effectively avoided.

The fluid outlet 9 is formed by at least one and preferably at least two throughflow openings in the valve housing 11, which here are configured as throughflow slots or gaps 41, 42 which are oriented in the circumferential direction of the housing and in the flow direction are downstream of the check valve 8.

If the valve closure 15 is spaced apart from the valve seat 14, the actuation slide 34 is also in its sliding position which is advanced in the direction toward the actuation arm 18 and in which the actuation slide 34 releases the at least one outlet opening 37 which leads to the fluid outlet 9. Water flowing in via the first fluid duct 28, 28' into the chamber 31 may thus likewise flow via the at least one outlet opening 37 to the fluid outlet 9, where the part-flows converge.

If the check valve 8 is closed, and if the valve closure 15 tightly bears on the valve seat 14, water flowing to the switch element 1, 2, 3, 4, 118, 122, 126, 130, 134, and 140 of the hand-held shower holding device may only flow into the chamber 31 by way of the first fluid duct 28, 28'. If a hand-held shower 5 is deposited in the hand-held shower holder 21, and if the actuation arm 18 is located in its lower pivot position which is shown in FIGS. 5, 8, 10, 12, 14, 15, 18, 19, 22, 23, 26, 27, 30, 31, 33, 36, and 39, the actuation slide 34 is retracted back in the direction which faces away from the actuation arm 18 in such a manner, that the actuation slide 34 closes off the at least one outlet opening 37 which leads from the chamber 31 to the fluid duct 9.

The hand-held shower holding device which is shown here in various exemplary embodiments is distinguished by high operational reliability, wherein damage caused by leakages in the region of the hose line are in particular effectively suppressed.

It can be seen from FIGS. 1 to 41 that the switch element 1, 2, 3, 4, 118, 122, 126, 130, 134, and 140 is designed as an insert cartridge which is insertable into a housing 50 of the hand-held shower holding device. It can be seen in FIGS. 1 and 2 that a bleeder or shower valve 6 may be provided on the hand-held shower 5.

LIST OF REFERENCE SIGNS

1 Switch element (according to FIGS. 1 to 7)
2 Switch element (according to FIGS. 8 and 9)
3 Switch element (according to FIGS. 10 and 11)
4 Switch element (according to FIGS. 12 and 13)
5 Hand-held shower
6 Shower valve
7 Actuation element (of the shower valve 6)
8 Check valve
9 Fluid outlet
10 Hose line
11 Valve housing
12 Cartridge receptacle
13 Throughflow opening
14 Valve seat
15 Valve closure
16 Valve plate
17 Valve plug (of the valve closure 15)
18 Actuation arm
19 Arm end (of the actuation arm 18)
20 Thread
21 Hand-held shower holder
22 Pivot axle (of the actuation arm 18)
23 Leg spring
24 Leg spring
25 Fastening openings
26 Spring end (of the leg spring 23)
27 Spring end (of the leg spring 24)
28 First fluid duct
29 First valve side
30 Second valve side
31 Chamber
32 Valve protrusion
33 Duct opening (in the valve protrusion 32)
34 Actuation slide
35 Rounded slide end
36 Switching cam
37 Outlet opening
38 Chamber wall
39 Connection plug
40 Valve-closure membrane
41 Throughflow gap
42 Throughflow gap
43 Second fluid duct
44 Inlet opening (of the second fluid duct 43)
45 Housing part
46 Housing part
47 Slide part (of the actuation slide 34)
48 Slide part (of the actuation slide 34)
49 Cover
50 Housing
51 Flexible tongue
52 Set screw
53 Slide housing
54 Retaining ring
55 Permanent magnet
56 Counterpiece
57 Guide groove
58 Retaining-ring bracket (58)/Retaining-ring cap (58')
59 Guide web
60 Restoring element
61 Restoring element
118 Switch element (according to FIGS. 14 to 17)
122 Switch element (according to FIGS. 18 to 21)
126 Switch element (according to FIGS. 22 to 25)
130 Switch element (according to FIGS. 26 to 29)
134 Switch element (according to FIGS. 30 to 35)
140 Switch element (according to FIGS. 36 to 41)

The invention claimed is:

1. A hand-held shower holding device comprising a switch element (1, 2, 3, 4, 118, 122, 126, 130, 134, 140) having an actuation arm (18) which on a first arm end (19) supports a hand-held shower holder (21) into which a hand-held shower (5) is depositable and which under a load of the hand-held shower (5) deposited in the hand-held shower holder (21) is pivotable from a first actuation position into a second actuation position, the switch element (1, 2, 3, 4, 118, 122, 126, 130, 134, 140) includes a check valve (8) which in a flow direction is upstream of a fluid outlet (9) which leads to the hand-held shower (5) and has a throughflow opening (13) which delimits a valve seat (14) which, in a closed position of the check valve is closed off by a valve closure (15), and wherein the actuation arm (18) actuates the check valve (8), a first fluid duct (28, 28') in the valve closure (15) of the check valve (8), said first fluid duct (28, 28') connecting a first valve side (29) which faces the throughflow opening (13) to a chamber (31) which is disposed on a second valve side (30) which faces away from the throughflow opening (13), an actuation slide (34) guided in a slide housing (53) so as to be displaceable in a slide longitudinal direction located in the switch element (1, 2, 3, 4, 118, 122, 126, 130, 134, 140), and which in a sliding position of the actuation slide (34) which is advanced in a direction toward the actuation arm (18) releases at least one outlet opening (37) which connects the chamber (31) to the fluid outlet (9), the actuation arm (18) and the actuation slide (34) are magnetically interlinked in a controlling connection through the slide housing (53), and a part-region of the first valve side (29) which in the closed position of the check valve (8) is delimited by the valve seat (14) is smaller in comparison with the second valve side (30) which faces the chamber (31).

2. The hand-held shower holding device as claimed in claim 1, wherein the switch element (1, 2, 3, 4, 118, 122, 126, 130, 134, 140) is an electric, magnetic, mechanical, or hydraulic switch element or a combination thereof.

3. The hand-held shower holding device as claimed in claim 1, wherein the switch element (1, 2, 3, 4, 118, 122, 126, 130, 134, 140) in the first actuation position of the actuation arm (18) releases a throughflow to the hand-held shower (5).

4. The hand-held shower holding device as claimed in claim 1, wherein the actuation slide (34) by way of a slide end thereof which faces the actuation arm (18) bears in a controlling connection on a switching cam (36) which is provided on a second end of the actuation arm (18).

5. The hand-held shower holding device as claimed in claim 1, wherein the slide housing (53) on an outer circumferential side is encompassed by at least one retaining ring (54), at least one permanent magnet (55) which interacts with a ferromagnetic counterpiece (56) on the in each case other of the actuation slide (34) or the retaining ring (54) is provided on the retaining ring (54) or on the actuation slide (34), and a pivoting movement on the actuation arm (18) is convertible into a sliding movement of the retaining ring which is displaceably guided on the slide housing (53).

6. The hand-held shower holding device as claimed in claim 1, further comprising a seal which in the closed position of the check valve (8) is disposed between the valve closure (15) and the valve seat (14).

7. The hand-held shower holding device as claimed in claim 6, wherein the seal is made from an elastic material.

8. The hand-held shower holding device as claimed in claim 1, wherein the valve closure (15) has a valve-closure membrane (40) which separates the first valve side (29) from the second valve side (30).

9. The hand-held shower holding device as claimed in claim 8, wherein the valve-closure membrane (40) by way of an outer membrane circumference thereof is tightly held on an inner circumference of a valve housing (11).

10. The hand-held shower holding device as claimed in claim 8, wherein a first fluid duct in the valve closure (15) is configured as a central fluid duct (28, 28') or is provided in the valve-closure membrane (40) of the valve closure (15).

11. The hand-held shower holding device as claimed in claim 1, wherein the actuation slide (34) is displaceably guided from a sliding position which is advanced toward the actuation arm (18) counter to a restoring force of at least one restoring element into a sliding position which is retracted in a direction which faces away from the actuation arm (18).

12. The hand-held shower holding device as claimed in claim 10, wherein the actuation slide (34) is rod-shaped and on an end side which faces the chamber (31) has at least one inlet opening (44), and at least one outlet opening (37) is provided on a circumferential side on the actuation slide (34).

13. The hand-held shower holding device as claimed in claim 12, wherein the actuation slide (34) is configured at least bipartite and has first and second slide parts (47, 48) which are guided independently displaceable of one another, the first slide part (47) which faces the chamber (31) on the end side has the at least one inlet opening (44) of the second fluid duct which penetrates the first slide part (47), the second slide part (48) which faces away from the chamber (31) by way of an end side thereof which faces the first slide part (47) in the closed position of the check valve (8) tightly closes off the second fluid duct, and in a sliding position of the second slide part (48) of the actuation slide (34), which is advanced in the direction toward the actuation arm (18), the slide parts (47, 48) are spaced apart from one another while forming a gap which is provided as an outlet opening (37).

14. The hand-held shower holding device as claimed in claim 1, wherein the actuation arm (18) is pivotable counter to a restoring force of at least one restoring element into the second actuation position.

15. The hand-held shower holding device as claimed in claim 14, wherein the restoring element is a flexible tongue (51), which by way of a free tongue-end region impinges the actuation arm.

16. The hand-held shower holding device as claimed in claim 15, wherein the flexible tongue (51) on a flexible-tongue side which faces away from the actuation arm (18) is impinged by a set screw (52), and pretensioning of the flexible tongue (51) is modifiable by the set screw (52).

17. The hand-held shower holding device as claimed in claim 14, wherein the at least one restoring element is a leg spring (23, 24) or a similar spring element.

18. The hand-held shower holding device as claimed in claim 17, wherein the at least one spring element (23, 24) acts with pretensioning on the actuation arm (18), and pretensioning of the at least one spring element (23, 24) which acts on the actuation arm (18) is modifiable.

19. The hand-held shower holding device as claimed in claim 17, wherein a plurality of engagement points (25) are provided on the actuation arm (18) so as to be laterally disposed thereon on a circular path about a pivot axle, the at least one spring element (23, 24) selectively engages on said engagement points (25).

20. The hand-held shower holding device as claimed in claim 1, wherein the switch element (1, 2, 3, 4, 118, 122, 126, 130, 134, 140) is an insert cartridge which is insertable into a housing of the hand-held shower holding device.

21. The hand-held shower holding device as claimed in claim 1, wherein a bleeder or shower valve (6) is provided on the hand-held shower (5).

* * * * *